United States Patent [19]
Takeuchi et al.

[11] Patent Number: 5,715,498
[45] Date of Patent: Feb. 3, 1998

[54] COLOR IMAGE FORMING APPARATUS AND METHOD FOR FORMING A COLOR IMAGE CORRECTED FOR ABERRATION IN REGISTRATION OF IMAGE STATIONS FOR EACH COLOR

[75] Inventors: Akihiko Takeuchi, Yokohama; Koichi Tanigawa, Tokyo; Toshio Miyamoto, Yokohama; Kazuaki Ono, Tokyo, all of Japan

[73] Assignee: Canon Kabushiki Kaisha, Tokyo, Japan

[21] Appl. No.: 525,100

[22] Filed: Sep. 8, 1995

[30] Foreign Application Priority Data

Sep. 16, 1994 [JP] Japan .................................. 6-221719
Sep. 16, 1994 [JP] Japan .................................. 6-221723

[51] Int. Cl.$^6$ ........................................ G03G 15/01
[52] U.S. Cl. ........................ 399/40; 399/72; 399/301
[58] Field of Search ........................... 355/203, 208, 355/327, 326 R; 399/40, 72, 301

[56] References Cited

U.S. PATENT DOCUMENTS

| | | | |
|---|---|---|---|
| 4,937,635 | 6/1990 | Paxon et al. | 355/326 R |
| 4,937,664 | 6/1990 | Chiku et al. | 355/327 X |
| 5,278,625 | 1/1994 | Charnitski et al. | 355/326 R |
| 5,287,162 | 2/1994 | De Jong et al. | 355/326 R |
| 5,373,355 | 12/1994 | Ando et al. | 355/327 |
| 5,523,823 | 6/1996 | Ashikaga | 355/208 |

FOREIGN PATENT DOCUMENTS 64-40956  2/1989  Japan.

*Primary Examiner*—William J. Royer
*Attorney, Agent, or Firm*—Fitzpatrick, Cella, Harper & Scinto

[57] ABSTRACT

A color image forming apparatus is provided with a number of image stations respectively corresponding to different color components and adapted to form images of respectively corresponding color components in succession and in superposed manner on a recording medium transported through the a number of image stations. The apparatus has memories for storing image data of respective color components to be supplied to the image stations, detectors for detecting aberration in registration of the images of respective color components formed by the image stations, and a controller for controlling the write-in positions of the image data of respective color components into the memories, based on the output of the detector.

20 Claims, 16 Drawing Sheets

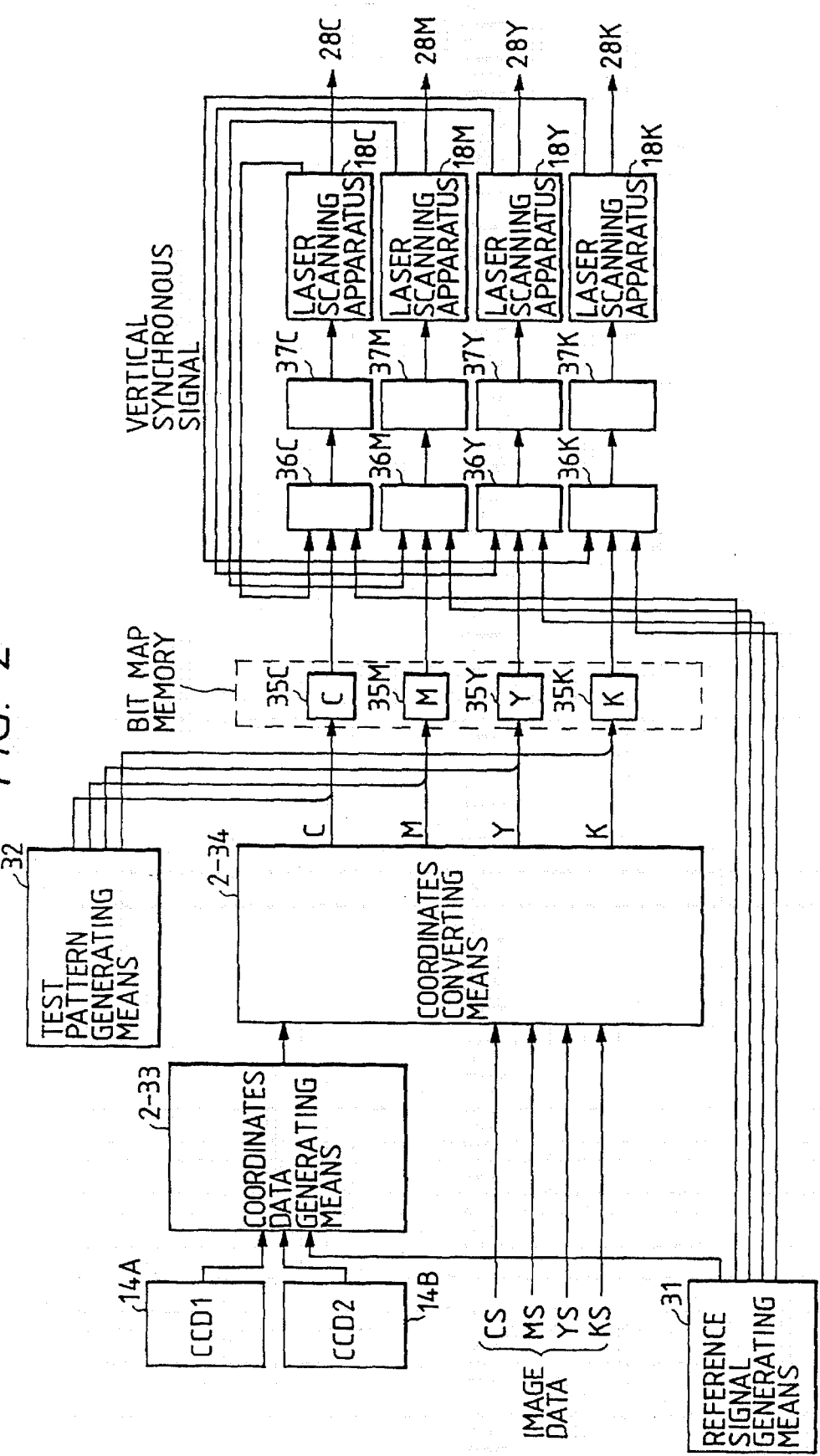

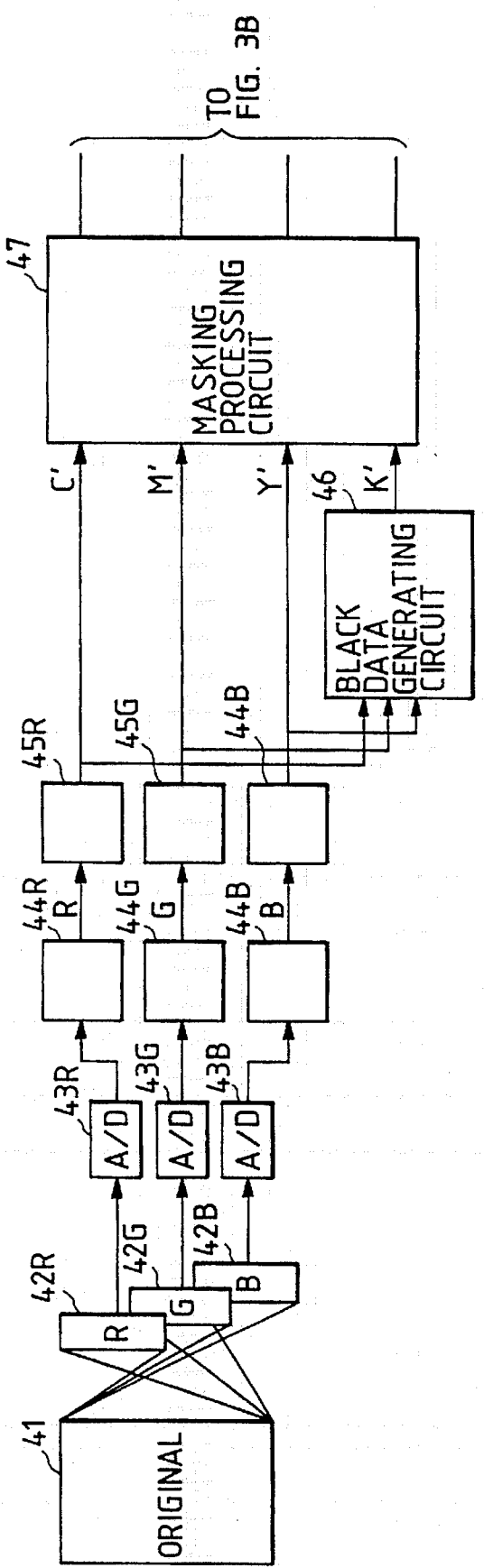

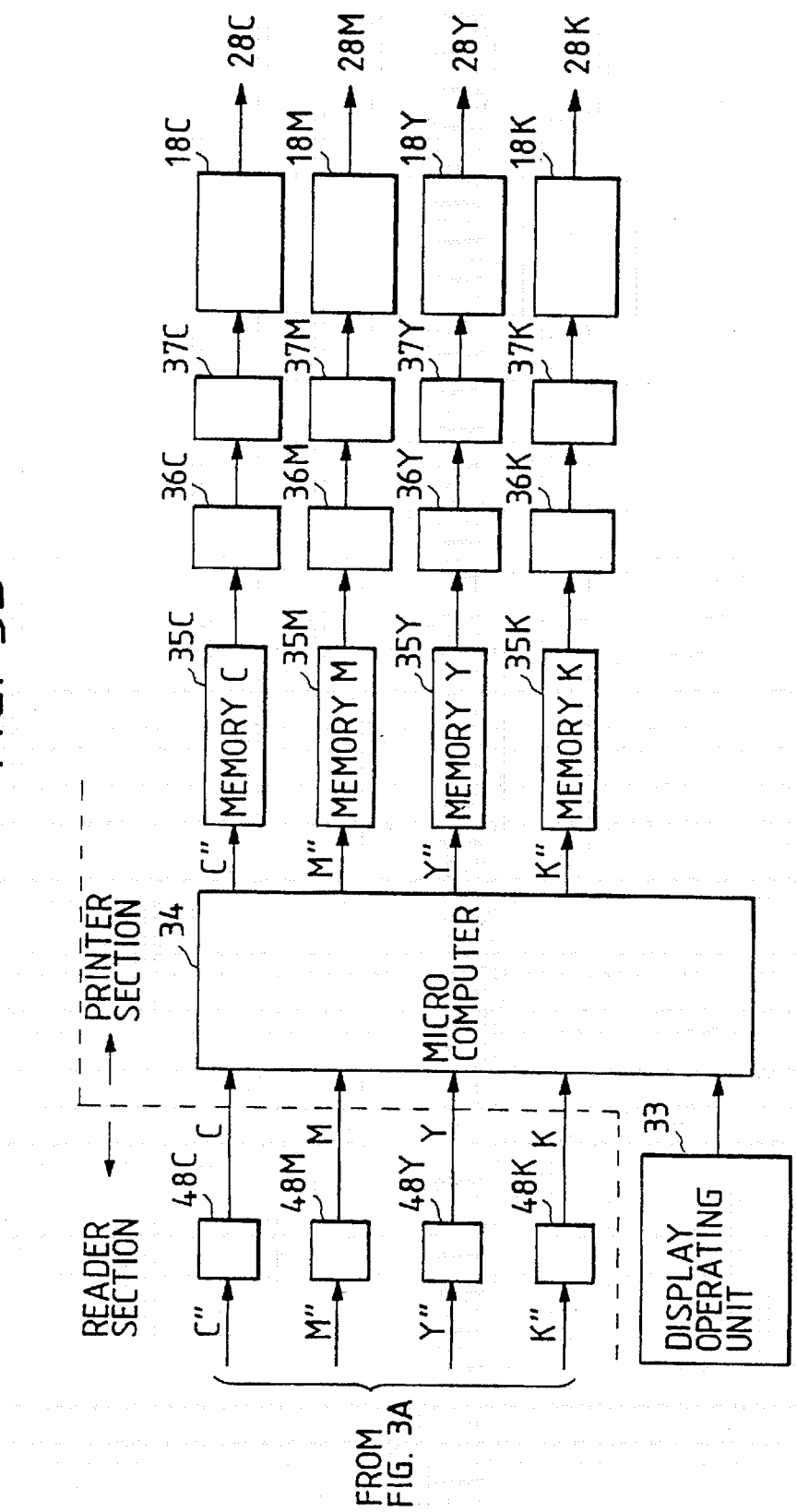

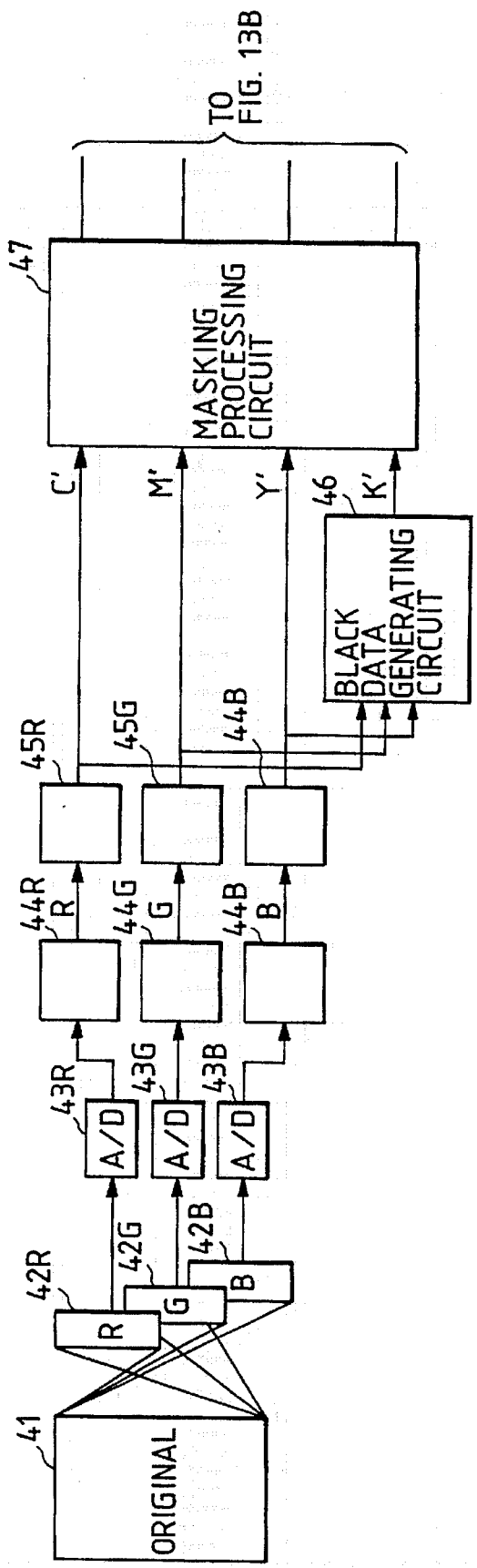

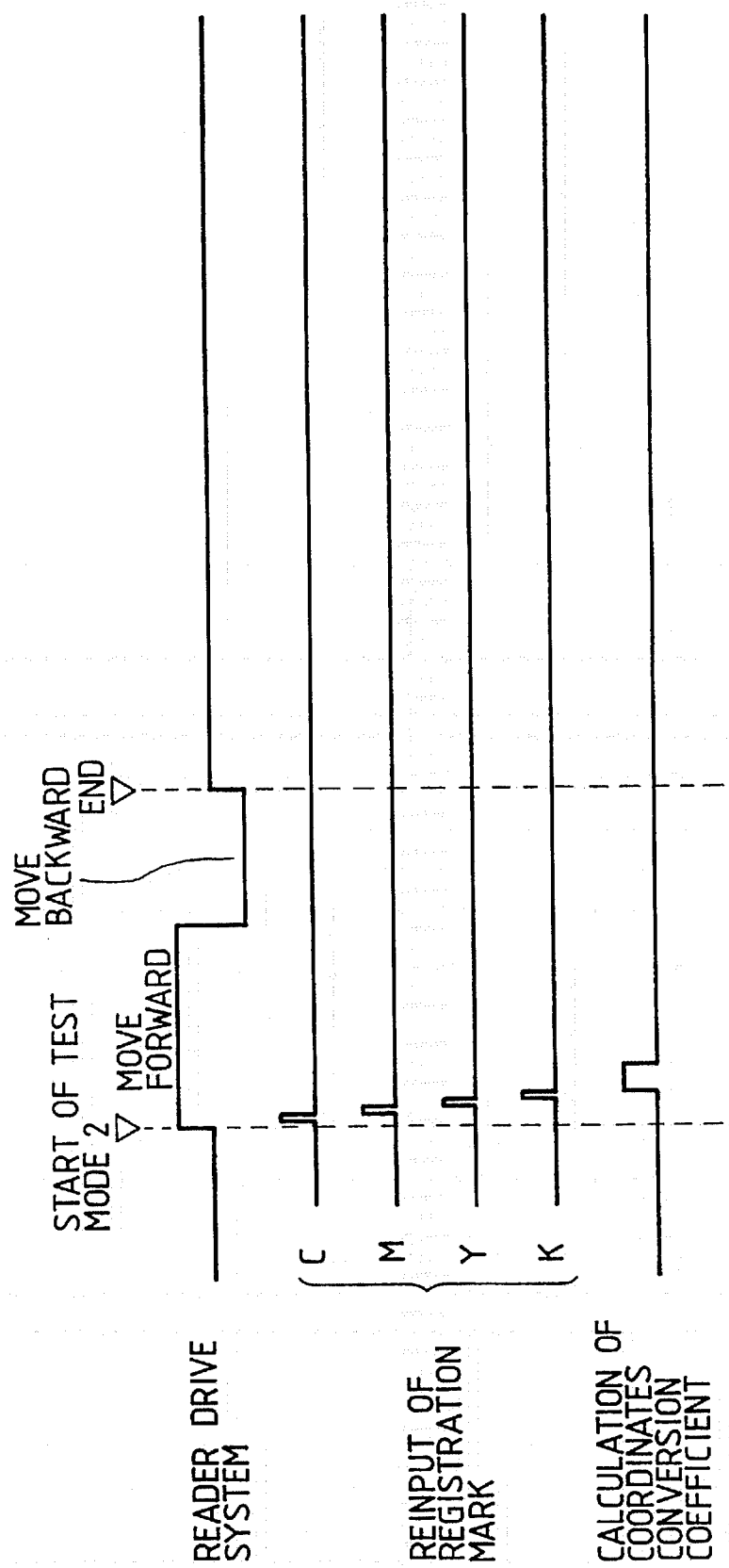

UNEVEN LINE
(BLANK AREA)

COLOR IMAGE FORMING APPARATUS AND METHOD FOR FORMING A COLOR IMAGE CORRECTED FOR ABERRATION IN REGISTRATION OF IMAGE STATIONS FOR EACH COLOR

BACKGROUND OF THE INVENTION

1. Field of the Invention

The present invention relates to a color image forming apparatus provided with plural image bearing members and adapted to transfer different color images in succession in a superposed manner onto a transported recording medium thereby forming a color image.

2. Related Background Art

The conventional color image forming apparatus utilizing an electrophotographic process generally employs a method of effecting image developments with respective colors utilizing plural developing units on a single photosensitive member and repeating steps of image exposure, image development and image transfer plural times to form color images in superposed manner on a single recording sheet, and fixing these images to obtain a full-color image.

Such method requires a long time because the image forming process has to be repeated three or four times (latter involving black color) for obtaining a printed image.

For resolving such drawback, there is proposed a method of employing plural photosensitive members and superposing, in succession, plural visible images of respective colors on a recording sheet, thereby obtaining a full-color print in a single sheet pass. This method can significantly improve the throughput, but it is difficult to obtain a high-quality full-color image because of the positional aberrations of the respective color images on the recording sheet, resulting from errors in the positional precision and diameters of the photosensitive members and in the positions of the optical system.

For avoiding such aberration in colors, there can be conceived, for example, a method of forming a test toner image on a recording sheet or on a conveyor belt constituting a part of the transfer means, then detecting the test image and correcting the optical paths of the optical systems or correcting the start positions of image recordings of respective colors based on the result of the detection (as disclosed in the Japanese Laid-open Patent Application No. 64-40956), but such method results in the following drawbacks.

Firstly, for correcting the optical path of the optical system, it becomes necessary to mechanically move a correcting optical system including a light source and an f-θ lens, or a mirror in the optical path so as to align the test toner images, but a higher precise movable member is required for this purpose, leading to a higher cost. Also, it is not possible to repeat the correction frequently as each correction requires a considerable time, but the aberration in the optical path length may vary in time, for example, because of temperature rise in the apparatus, and it is difficult, in such case, to prevent the aberration in colors by the correction of the optical path in the optical system.

Secondly, the correction of the start position of image recording enables correction of the positional aberration at the left-hand end and at the upper left portion, but is unable to achieve correction for the inclination of the optical system or for the aberration in image magnification resulting from that in the optical path length.

SUMMARY OF THE INVENTION

The present invention has been attained in order to resolve the drawbacks mentioned above, and an object thereof is to provide a color image forming apparatus capable of releasing a color image, corrected for the aberration in registration of the image stations, at a high speed with a simple configuration and without mechanical correction of the arrangement of the optical scanning systems in the respective image stations, by calculating coordinates of positional aberrations through comparison of the positions of registration marks formed by the respective image stations with a reference position, and converting the output positions of the respective input color images to corrected output positions based on thus calculated coordinates of positional aberrations.

Another object of the present invention is to provide a color image forming apparatus capable of providing a satisfactory color image at a high speed, by calculating coordinates of positional aberrations through comparison of the positions of registration marks formed by the respective image stations with a reference position, converting the output positions of the respective input color images to corrected output positions based on thus calculated coordinates of positional aberrations, and correcting the position of the modulated light beam by an amount smaller than the minimum dot unit of each color signal based on the converted image data of each color thereby achieving exposure with the light beam under suppression of the image deterioration resulting from quantizing error associated with the coordinate conversion, whereby, even in the presence of aberrations in the registration of the image stations resulting, for example, from the errors in the mechanical arrangement of the optical scanning systems, the image stations release the pixels of respective colors in such positions as to compensate the aberrations in registration, and the output position in the main scanning direction is corrected with an amount smaller than the minimum coordinate unit in the main scanning direction to securely prevent deterioration of the output image by streaks resulting from the quantizing error generated in the image conversion process.

According to the present invention, there is provided a color image forming apparatus provided with a plurality of image stations each including exposure means for irradiating a photosensitive member with a light beam modulated by respective color signal thereby forming an electrostatic latent image; development means for developing the electrostatic latent image, formed on the photosensitive member by the exposure means, into a visible image; and transfer means for transferring the respective color image, obtained by the development means, onto a recording sheet, and adapted to transfer the color images formed by the respective image stations in succession onto a recording sheet transported by transport means thereby forming a color image, the apparatus comprising test pattern generation means for generating predetermined test pattern data for detecting the aberration in registration; memory means for storing test pattern data of the respective colors generated by the test pattern generation means; reader means for reading a test pattern image which is formed in each image station based on the test pattern data of each color read from the memory means and is transferred to the transfer means; coordinate data generation means for generating coordinate information for formation of each pattern transferred to the transfer means, from the information of each test pattern image read by the reader means; and coordinate conversion means for automatically converting the output coordinate position of image data of each color into an output coordinate position corrected for the aberration in registration, based on an amount of aberration determined from the coordinate information for each pattern formation generated by the coordinate data generation means and from the information of a predetermined reference position, wherein the image data of the respective colors converted by the coordinate conversion means are developed into the memory means and, in the exposure means of the image stations, the photosensitive members are respectively exposed to the light beams modulated according to thus developed image data.

Consequently, based upon the amount of abberation determined from the coordinate information of each pattern formation, generated by the coordinate data generation means according to the image information of each test pattern read by the reader means and also from the information of the predetermined reference position, the coordinate conversion means automatically converts the output coordinate position of the image data of the respective colors into output coordinate positions corrected for the aberration in registration. Thus, converted image data of respective colors are developed in the memory means, and the exposure means of the image stations irradiate the respective photosensitive members with light beams modulated according to thus developed image data, whereby, even if the image stations have aberrations in registration, for example, because of errors in the mechanical arrangement of the optical scanning systems, the image stations release the color images in such positions as to compensate the aberrations in registration and a color image without aberration in colors can be released at a high speed.

Preferably, the reader means is so constructed as to read the test pattern image which is formed in each image station based on the test pattern data of each color read from the memory means and is transferred onto the recording material on the transport means, thereby being capable of precisely detecting the amount of aberration in registration of each image station.

Also, according to the present invention, there is provided a color image forming apparatus provided with a plurality of image stations each including exposure means for irradiating a photosensitive member with a light beam modulated by respective color signal thereby forming an electrostatic latent image; development means for developing the electrostatic latent image, formed on the photosensitive member by the exposure means, into a visible image; and transfer means for transferring the respective color image, obtained by the development means, onto a recording sheet, and adapted to transfer the color images formed by the respective image stations in succession onto a recording sheet transported by transport means thereby forming a color image, each of the image stations comprising test pattern generation means for generating predetermined test pattern data for detecting the aberration in registration; memory means for storing test pattern data of the respective color generated by the test pattern generation means; reader means for reading a test pattern image which is formed in the image station based on the test pattern data of each color read from the memory means and is transferred to the transfer means; coordinate data generation means for generating coordinate information for formation of each pattern transferred to the transfer means, from the information of each test pattern image read by the reader means; coordinate conversion means for automatically converting the output coordinate position of image data of each color into an output coordinate position corrected for the aberration in registration, based on an amount of aberration determined from the coordinate information for each patten formation generated by the coordinate data generation means and from the information of a predetermined reference position; and correction means for correcting the position of the light beam, modulated according to the image data of each color converted by the coordinate conversion means, by an amount smaller than the minimum dot unit of the color signal, wherein the exposure means of the image stations respectively irradiate the photosensitive members with the light beams corrected by the correction means.

Consequently, based upon the amount of aberration determined from the coordinate information of each pattern formation, generated by the coordinate data generation means according to the image information of each test pattern read by the reader means and also from the information of the predetermined reference position, the coordinate conversion means automatically converts the output coordinate position of the image data of the respective color into output coordinate position corrected for the aberration in registration, and correction means corrects the position of the modulated light beam by an amount smaller than the minimum dot unit of the color signal, based on thus converted image data of each color. Thus, the exposure with the light beams is achieved while suppressing the image deterioration resulting from the quantizing error associated in the coordinate conversion process, and, even in the presence of aberrations in registration of the image stations, for example, because of errors in the mechanical arrangement of the optical scanning systems, the image stations release the images of respective colors in such positions as to compensate such aberrations in registration, whereby the position of the image signal is corrected with an amount smaller than the minimum coordinate unit in the main scanning direction and the color image without deterioration by aberration in colors can be released at a high speed.

Also, according to the present invention there is provided a color image forming apparatus provided with a plurality of image stations each including exposure means for irradiating a photosensitive member with a light beam modulated by respective color signal thereby forming an electrostatic latent image; development means for developing the electrostatic latent image, formed on the photosensitive member by the exposure means, into a visible image; and transfer means for transferring the respective color image, obtained by the development means, onto a recording sheet, and adapted to transfer the color images formed by the respective image stations in succession, onto a recording sheet transported by transport means thereby forming a color image, each of the image stations comprising test pattern generation means for generating predetermined test pattern data for detecting the aberration in registration; memory means for storing test pattern data of the respective color generated by the test pattern generation means; reader means for reading a test pattern image which is formed in the image station based on the test pattern data of each color read from the memory means and is transferred to the transfer means; coordinate data generation means for generating coordinate information for formation of each pattern transferred to the transfer means, from the information of each test pattern image read by the reader means; coordinate conversion means for automatically converting the output coordinate position of image data of each color into an output coordinate position corrected for the aberration in registration, based on an amount of aberration determined from the coordinate information for each pattern formation generated by the coordinate data generation means and from the information of a predetermined reference position; and correction means for correcting the light amount of the light beam subjected to pulse width modulation based on the image data of each color converted by the coordinate conversion means, wherein the exposure means of the image stations respectively irradiate the photosensitive members with the light beams of which light amounts are corrected by the correction means.

Consequently, based upon the amount of aberration determined from the coordinate information of each pattern formation, generated by the coordinate data generation means according to the image information of each test pattern read by the reader means and also from the information of the predetermined reference position, the coordinate conversion means automatically converts the output coordinate position of the image data of the respective color into output coordinate position corrected for the aberration in registration, and correction means corrects the light amount of the pulse width modulated light beam according to thus converted image data of each color. Thus the exposure with the light beams is achieved while suppressing the image deterioration resulting from the quantizing error associated in the coordinate conversion process, and, even in the presence of aberrations in registration of the image stations, for example, because of errors in the mechanical arrangement of the optical scanning systems, the image stations release the images of respective colors in such positions as to compensate such aberrations in registration, whereby the position of the image signal is corrected with an amount smaller than the minimum coordinate unit in the main scanning direction and the color image without deterioration by aberration in colors can be released at a high speed.

Preferably, the correction means is so constructed as to correct the light amount of the light beam by modifying the turn-on time of each dot exposed with pulse width modulation, based on the image data of respective color converted by the coordinate conversion means, thereby enabling to superpose respective color without aberration in registration or without streak formation by positional correction by an amount smaller than the minimum coordinate unit in the main scanning direction.

Also, according to the present invention, there is provided a color image forming apparatus provided with a reader unit for optically reading an original image and a printer unit including a plurality of image stations each including exposure means for irradiating a photosensitive member with a light beam modulated by respective color signal based on respective color image information from the reader unit thereby forming an electrostatic latent image; development means for developing the electrostatic latent image, formed on the photosensitive member by the exposure means, into a visible image; and transfer means for transferring the respective color image, obtained by the development means, onto a recording sheet and adapted to transfer the color images, formed in the respective image stations, in succession onto a recording material transported by transport means thereby forming a color image, wherein each of the image stations in the printer unit comprises first test mode process means for printing, on the recording material, a registration mark composed of a predetermined pattern including a reference coordinate; second test mode process means for detecting the coordinate of the position of the registration mark by reading the registration mark, formed by the first test mode process means on the recording material, through the reader unit; and coordinate conversion means for automatically converting the output coordinate position of the image data of respective color to an output coordinate position corrected for the aberration in registration, based on an amount of aberration determined from the coordinate of position of the registration mark detected by the second test mode process means and from a predetermined reference coordinate, wherein the image data of respective colors converted by the coordinate conversion means are developed in the memory means, and the exposure means in the image stations irradiate the respective photosensitive members with light beams modulated according to thus developed image data.

Consequently, in the image station of the printer unit, the registration mark composed of a predetermined pattern including a reference coordinate, formed on the recording material by the first test mode process means, is read by the reader unit, then the second test mode process means detects the coordinates of position of the registration marks and the coordinate conversion means automatically converts the output coordinate position of the image data of respective color to an output coordinate position corrected for the aberration in registration, based on an amount of aberration determined from thus detected coordinate of position of the registration mark and from a predetermined reference coordinate. Thus, converted image data of respective colors are developed in the memory means, and the exposure means of the image stations irradiate the respective photosensitive members with light beams modulated according to the developed image data. Consequently, even in the presence of aberrations in registration of the image stations for example because of errors in the mechanical arrangement of the optical scanning systems, a color image without aberration in color can be obtained at a high speed, as the registration marks released from the printer unit are read in the reader unit and the image stations release the respective color images in such positions as to compensate such aberrations in registration.

BRIEF DESCRIPTION OF THE DRAWINGS

FIG. 2 is a block diagram of a registration correcting circuit in the color image forming apparatus shown in FIG. 1;

FIG. 3 which is composed of FIGS. 3A and 3B is a block diagram showing the data processing flow when a color original reading device is connected to the color image forming apparatus shown in FIG. 1;

FIG. 16 is a timing chart showing the operation in a test mode 2 in the color image forming apparatus shown in FIG. 12;

DETAILED DESCRIPTION OF THE PREFERRED EMBODIMENTS

Now, the present invention will be clarified in detail by preferred embodiments thereof with reference to the attached drawings.

[First Embodiment]

Figure 1:
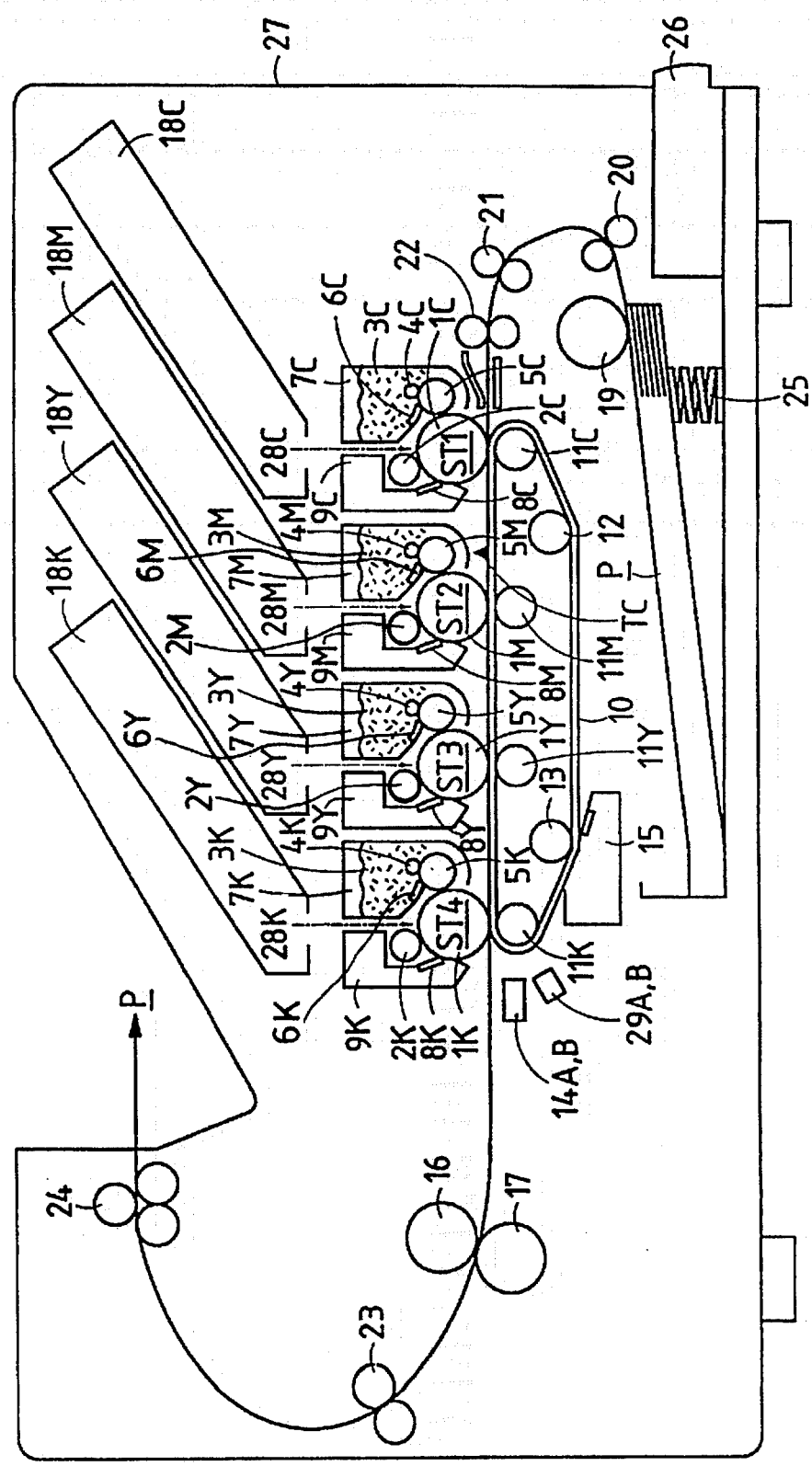
FIG. 1 is a schematic cross-sectional view of a color image forming apparatus constituting a first embodiment of the present invention.

FIG. 1 is a schematic cross-sectional view of a color image forming apparatus, constituting first to fifth embodiments of the present invention and corresponding, for example, to a color laser beam printer with four drums.

An OPC photosensitive drum 1C for cyan color constitutes an integral process cartridge, together with a drum unit 9C including a cleaner 8C and a charging roller 2C, and a developing unit 7C including a developing sleeve 5C, an application roller 4C, a non-magnetic one-component developer 3C and an application blade 6C. A transfer roller 11C transfers a color image onto a recording sheet P, supported by a transfer belt 10 transported by rollers 12, 13.

The recording sheets P are contained in a cassette 26 and are biased upwards by a spring 25 in such a manner that the uppermost sheet is in contact with a pick-up roller 19. Transport rollers 20, 21 transport the recording sheet P, separated by the pick-up roller 19, toward registration rollers 22. A heat fixing roller 16 fixes, by thermal fusion, the toner image transferred on the recording sheet P, in cooperation with a pressure roller 17. A laser scanning device 18C emits a scanning beam 28C modulated according to image signals. 27 indicates a casing of the printer (printer unit). Transport rollers 23 transport the recording sheet P, after the thermal fixing process, toward discharge rollers 24.

CCD sensors 14A, 14B read the reflected image information of registration marks for detecting the amount of aberration in registration, transferred onto the transfer belt 10 and illuminated by exposure lamps 29A, 29B. After the reading, the registration mark (toner image) is removed by a cleaner 15.

An OPC photosensitive drum 1M for magenta color constitutes an integral process cartridge, together with a drum unit 9M including a cleaner 8M and a charging roller 2M and a developing unit 7M including a developing sleeve 5M, an application roller 4M, non-magnetic one-component developer 3M and an application blade 6M. A transfer roller 11M transfers a developed color image onto the recording sheet P supported by the transfer belt 10 transported by the rollers 12, 13. A laser scanning device 18M emits a scanning beam 28M modulated according to the image signals.

An OPC photosensitive drum 1Y for yellow color constitutes an integral process cartridge, together with a drum unit 9Y including a cleaner 8Y and a charging roller 2Y and a developing unit 7Y including a developing sleeve 5Y, an application roller 4Y, non-magnetic one-component developer 3Y and an application blade 6Y. A transfer roller 11Y transfers a developed color image onto the recording sheet P supported by the transfer belt 10 transported by the rollers 12, 13. A laser scanning device 18Y emits a scanning beam 28Y modulated according to the image signals.

An OPC photosensitive drum 1K for black color constitutes an integral process cartridge, together with a drum unit 9K including a cleaner 8K and a charging roller 2K and a developing unit 7K including a developing sleeve 5K, an application roller 4K, non-magnetic one-component developer 3K and an application blade 6K. A transfer roller 11K transfers a developed color image onto the recording sheet P supported by the transfer belt 10 transported by the rollers 12, 13. A laser scanning device 18K emits a scanning beam 28K modulated according to the image signals.

FIG. 2 is a block diagram of a registration correcting circuit in the color image forming apparatus shown in FIG. 1, wherein components same as those in FIG. 1 are represented by same symbols.

Reference signal generating means 31 sends a predetermined reference signal to coordinates data generating means 2-33 and lines memories 36C, 36M, 36Y, 36K. Bit map memories 35C, 35M, 35Y, 35K respectively store image data DC, DM, DY, DK released from coordinates converting means 2-34 or pattern image data PDC, PDM, PDY, PDK released from test pattern generating means 32.

Pulse width modulation circuits 37C, 37M, 37Y, 37K respectively drive semiconductor lasers 18C, 18M, 18Y, 18K based on the data stored in the line memories 36C, 36M, 36Y, 36K thereby emitting scanning beams 28C, 28M, 28Y, 28K.

FIGS. 3A and 3B are block diagrams showing the data process flow in case a color original reading device is connected to the color image forming apparatus shown in FIG. 1, wherein the same components as those in FIGS. 1 and 2 are represented by the same symbols. In additon, FIG. 3B shows display operating unit 33.

An original 41 is scanned by unrepresented optical scanning means, and the resulting reflected light is separated into three primary colors R, G, B which are respectively converted by CCD sensors 42R, 42G, 42B into multi-value color signals. A/D converters 43R, 43G, 43B respectively convert the multi-value color signals, released from the CCD sensors 42R, 42G, 42B into digital signals corresponding to the luminance, for respective supply to shading correcting circuits 44R, 44G, 44B. Gamma conversion units 45R, 45G, 45B convert the luminance data R, G, B, subjected to shading correction in the shading correcting circuits 44R, 44G, 44B, into image data C', M', Y' of complementary colors of yellow (Y), magenta (M) and cyan (C).

A black data generating circuit 46 extracts black image data K' from the above-mentioned image data C', M', Y'. A masking processing circuit 47 effects predetermined masking process on the image data C', M', Y' and K'. Gamma conversion units 48C, 48M, 48Y, 48K respectively correct the gradation of the image data C', M', Y', K' according to the gradation characteristics of the printer.

At first, there will be explained the generation process of the color image data in the color image forming apparatus of the present invention.

The color image data are either obtained from a graphic image of a computer or by reading a color original with a color reader or the like.

In the former case, the full color signals generated in the computer can be directly used as the image data. In the latter case, the image data are generated by the image processing as in the reader unit shown in FIGS. 3A and 3B.

Referring to FIGS. 3A and 3B, a full-color image of the original 41 is separated by suitable optical means (not shown) into three primary colors of red (R), green (G) and blue (B) and then converted into multi-value color signals by the CCD sensors 42R, 42G, 42B. For obtaining a satisfactory image, the optical system preferably has a resolving power of 400–600 dot/inch.

The analog outputs of the CCD sensors 42R, 42G, 42B are converted into digital signals, corresponding to the luminance, by the A/D converters 43R, 43G, 43B. For obtaining a satisfactory image, there are preferably selected 64 to 256 digital levels or even larger. The luminance data thus obtained are processed by the shading correction circuits 44R, 44G, 44B for correcting the fluctuation in the optical systems and in the pixels of the CCD sensors, and are converted by the gamma conversion units 45R, 45G, 45B in which the red, green and blue luminance data are converted by the data of complementary colors of cyan, magenta and yellow, by a logarithmic reciprocal conversion.

Then, the black data generating circuit 46 extracts black (K') data from thus obtained C', M', Y' data. This can be done in various methods, but, as an example, the black data can be obtained from the minimum values of C', M', Y'. The masking processing circuit 47 effects masking on thus obtained image data C', M', Y', K'. In general, the masking is achieved by effecting a calculation according to: $C''=a_{11}C'+a_{12}M'+a_{13}Y'+a_{14}fn(K')$ wherein $f(K')$ is an n-th order polynominal for the data K' by preparing a matrix:

$$I = \begin{pmatrix} a_{11} & a_{12} & a_{13} & a_{14} \\ \vdots & & & \vdots \\ a_{41} & \cdots & \cdots & a_{44} \end{pmatrix} \quad (1)$$

and conducting this calculation for C", M", Y" and K". In the foregoing equation, $a_{11}$–$a_{14}$ are experimentally determined constants.

Then, the gamma conversion units 48C, 48M, 48Y, 48K effect correction of gradation, in order to match the image data C", M", Y", K" generated by the masking process with the gradation characteristics of the printer.

In the following, there will be given an explanation, with reference to FIG. 1 and other drawings, on the printer unit for printing thus obtained image data C, M, Y, K.

At first, pulse width modulation circuits 37C–37K convert the density image signals C, M, Y, K of 256 levels into pulse width signals corresponding to the turn-on time of the laser, for supply to the laser scanning devices 18C, 18M, 18Y, 18K.

Figure 4:
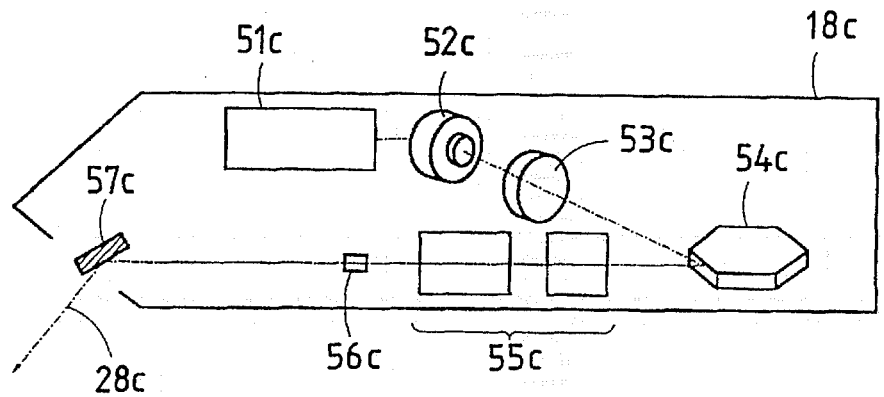
FIG. 4 is a schematic view of a laser scanning device shown in FIG. 1.

FIG. 4 is a schematic view showing the configuration of the laser scanning device 18C shown in FIG. 1. The laser scanning devices 18M, 18Y, 18K are also constructed similarly.

As shown in FIG. 4, the cyan image signal C after pulse width modulation is supplied to a laser drive circuit 51C for on-off driving of a semiconductor laser 52C including a collimating lens. The laser beam formed as a parallel light beam by the collimating lens is formed flat by a cylindrical lens 53C and enters a polygon mirror 54C thereby obtaining a scanning beam.

Then, the scanning beam 28C is released through a correcting optical system 55C composed of two groups and having f-θ characteristics and beam shaping function. There are also provided a beam detector (BD) 56C for detecting a part of the scanning beam thereby generating a vertical synchronization signal, and a mirror 57C. The scanning beams 28C, 28M, 28Y, 28K thus obtained respectively enter the corresponding photosensitive drums 1C, 1M, 1Y, 1K.

In the following, there will be given an explanation on the function, taking the cyan scanning beam 28C.

The OPC photosensitive drum 1C is provided in the integral process cartridge provided with the drum unit 9C including the cleaner 8C and the charging roller 2C and the developing unit 7C including the developing sleeve 5C, application roller 4C, non-magnetic one-component developer 3C and application blade 6C. At first, the photosensitive drum 1C is uniformly charged, negatively, by the charging roller 2C. Then it is exposed to the scanning beam 28C according to the image information of the cyan color, thereby forming an electrostatic latent image. The area exposed to the laser beam is subjected to reversal development by the negative developer 3C supported on the surface of the developing sleeve 5C. The visible cyan toner image TC, obtained on the photosensitive drum 1C, is transferred, by the transfer roller 11C with a positive bias voltage, onto the recording sheet P on the transfer belt.

The toner remaining on the photosensitive drum 1C is recovered by the cleaner 8C. The recording sheet P in the cassette 26 is pressed to the pick-up roller 19 by the spring 25, and is fed by the rotation of the pick-up roller 19. It is then transported by the transport rollers 20, 21 and the registration rollers 22 and is placed on the transfer belt 10 rotated by the transfer rollers 11C, 11M, 11Y, 11K and the rollers 12, 13, whereby the cyan image, magenta image, yellow image and black image are transferred in succession and in superposed manner onto the surface of the recording sheet P, by means of the transfer rollers 11C, 11M, 11Y, 11K provided behind the transfer belt and given positive bias voltages.

Then, these color images are fixed by fusion between the heat fixing roller 16 and the pressure roller 17, and the recording sheet is discharged from the printer unit 27 through the transport rollers 23 and the discharge rollers 24.

The transfer belt 10 is preferably composed of a dielectric material with a volume resistivity of $10^{11}$–$10^{16}$ Ωcm. In the present embodiment, it is composed of a semiconductive polycarbonate film of a thickness of 200 μm, containing white pigment dispersed therein and having a volume resistivity of ca. $10^{12}$ Ωcm, and the transfer rollers 11C–11K have a diameter of 20 mm and are composed of chloroprene rubber with a volume resistivity of $10^5$ Ωcm. A positive transfer bias current of about 10–20 μA, supplied from a constant current source (not shown) to the rear face of the transfer belt through the transfer rollers provided satisfactory image transfers, with satisfactory adhesion of the recording sheet P to the transfer belt 10.

In the above-explained configuration, the gamma conversion units 48C–48K shown in FIG. 3B may naturally be provided also in the printer unit.

In the following, there will be explained the device for preventing the aberration among the colors C, M, Y and K in the above-explained full-color printer.

At first, referring to FIG. 1, a registration mark for detecting the print position is formed on the transfer belt 10, prior to the actual printing operation. The registration mark may be of any form, but, a mark shaped as "#" as shown in FIG. 5 enables satisfactory detection of position utilizing the vertical and horizontal edges.

Then, the formed registration mark is illuminated by the exposure lamps 29A, 29B, and the reflected light is read by the CCD sensors 14A, 14B with condenser lenses. After reading, the registration mark is cleaned by the cleaner 15.

In the following, there will be given detailed explanation on the method of formation and reading of the registration mark.

Figure 5:
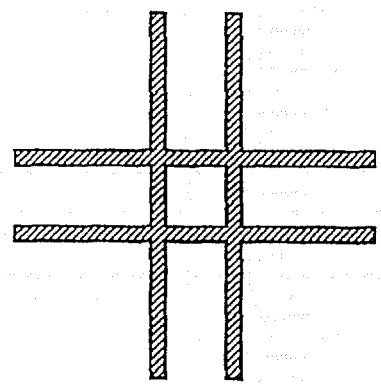
FIG. 5 is a view showing an example of the registration mark for detecting the aberration in registration, in the color image forming apparatus of the present invention.

For forming the registration mark, the test pattern generation means 32 in FIG. 2 generates an image as shown in FIG. 5 in the form of dot signals, which are stored, without passing through the coordinates converting means 34, in the bit map memories 35C, 35M, 35Y, 35K in respective colors.

Now there will be explained the method of recording and reading the registration mark, as an example, in case of cyan color.

At first, coordinates to be designated by the registration mark (for example the central positions of the # pattern shown in FIG. 5) are selected as $A(x_1, y_1)$, $B(x_2, y_2)$, $C(x_3, y_3)$ and $D(x_4, y_4)$. Then, four registration marks, formed with dot patterns around these four coordinates are converted into dots and stored in the corresponding bit map memory 35C. The bit map memories 35C, 35M, 35Y, 35K had a size larger than that of the maximum image data.

Then, at predetermined timings, the transfer belt 10 and the process cartridge are activated in synchronization with the reference signal generating means 31, whereby four registration patterns are formed on the transfer belt 10, corresponding to the dots stored in the bit map memory 35C.

More specifically, the data in each scanning line of the bit map memory 35C are once transferred to the line memory 36C, and, in synchronization with the vertical synchronization signal generated by the beam detection signal from the laser scanning device 18C and with the reference signal, they are supplied to the laser drive circuit 51C in succession through the pulse width modulation circuit 37C to effect on-off drive of the semiconductor laser 52C, thereby forming the registration mark.

The registration marks thus formed should be respectively on the predetermined positions on the transfer belt, if the optical system and the mechanical arrangement involve no error.

Figure 6:
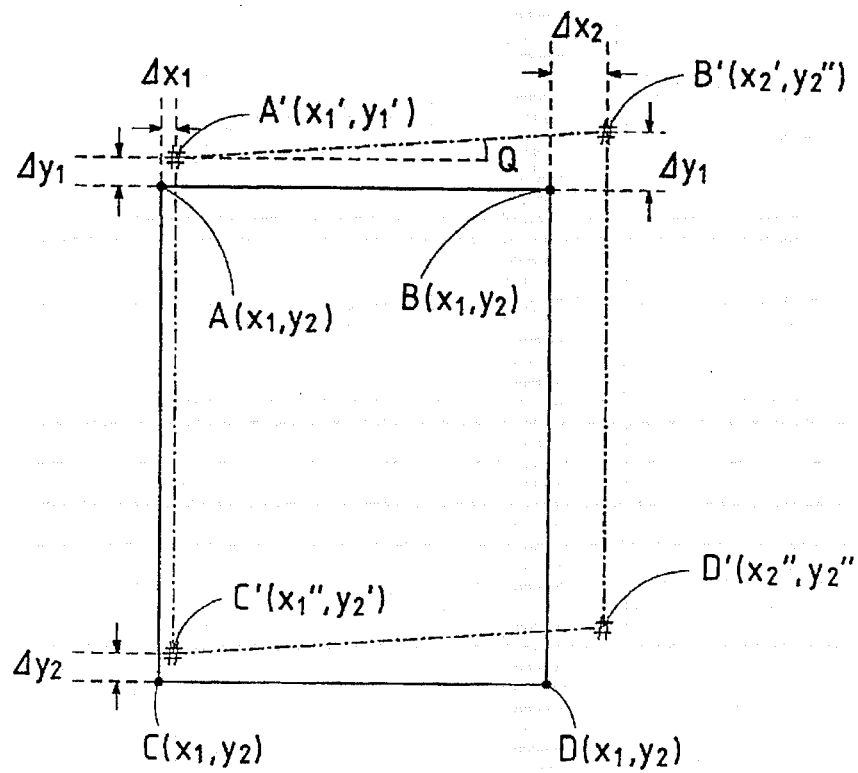
FIGS. 6 and 7 are views showing the principle of correction for the aberration in registration in the color image forming apparatus of the present invention.

However, if the laser scanning device 18C involves mechanical errors such as an error in the inclination or focal length of the mirror 57C or if a mutual aberration exists among the drum unit 9C, the laser scanning device 18C and the transfer belt 10, the actual positions of the registration marks on the transfer belt 10 are displaced from A, B, C, D to A', B', C', respectively, as shown in FIG. 6.

These registration marks are illuminated by the light sources 29A, 29B and are read by the CCD sensors 14A, 14B positioned close to the transfer belt 10, and, based on the timing of reading of the registration marks (i.e. sub scanning position) and the position to the CCD sensors in the main scanning direction, the coordinates data generating means 2-33 can generate the coordinates of the positions $A'(x_1', y_1')$, $B'(x_2', y_2')$, $C'(x_3', y_3')$ and $D'(x_4', y_4')$.

The present embodiment employs two CCD sensors of pixels each, and the lenses (not shown) of the CCD sensors 14A, 14B are so adjusted that the registration marks on the transfer belt 10 can be read with a resolving power of 600 dot/inch.

By defining $\Delta x_1$, $\Delta x_2$, $\Delta y_1$, $\Delta y_1'$ and $\Delta y_2$ with thus determined coordinates in the following manner:

$$\Delta x_1 = x_1' - x_1 \quad (2)$$
$$\Delta x_2 = x_2' - x_2$$
$$\Delta y_1 = y_1' - y_1$$
$$\Delta y_1' = y_1'' - y_1$$
$$\Delta y_2 = y_2' - y_2$$

the true coordinate $Q(x, y)$ and the actual coordinate $Q'(x', y')$ can be correlated in the following equations (3):

$$x' = x + \Delta x_1 + \frac{\Delta x_2 - \Delta x_1}{x_2 - x_1} \times x \quad (3)$$

$$y' = y + \Delta y_1 + \frac{\Delta y_2 - \Delta y_1}{y_2 - y_1} \times y + x\tan\theta$$

$$= y + \Delta y_1 + \frac{\Delta y_2 - \Delta y_1}{y_2 - y_1} \times y + \frac{\Delta y_1' - \Delta y_1}{x_2 - x_1} \times x$$

$$x = \frac{(x' - x_1' + x_1)(x_2 - x_1)}{x_2' - x_1'} = C_1(x' + C_2)$$

$$y = \left\{ y' - y_1' + y_1 - \frac{(x' - x_1' + x_1)(y_1'' - y_1')}{x_2' - x_1'} \right\} \times \frac{y_2 - y_1}{y_2' - y_1'}$$

$$= C_3 \times \{y' + C_4 + C_5(x' + C_2)\}$$

$$C_1 = \frac{x_2 - x_1}{x_2' - x_1'}$$

$$C_2 = x_1 - x_1'$$

$$C_3 = \frac{y_2 - y_1}{y_2' - y_1'}$$

$$C_4 = y_1 - y_1'$$

$$C_5 = \frac{y_1'' - y_1'}{x_2' - x_1'}$$

Thus, by measuring the coordinates A', B', C', D' by the registration marks and determining and storing $C_1$–$C_5$ in the coordinate converting means 34, it is rendered possible to correct the print position on the recording sheet P, in the bit map memory 35C based on the foregoing equations.

More specifically, after the registration marks are formed for example in a pre-rotation prior to the printing operation to determine $C_1$–$C_5$, the image can be formed in the correct position on the transfer belt 10 by converting the coordinates of the image data by the coordinate converting means 34, from $Q'(x', y')$ (i.e. the coordinates of the original image data) in succession into $S(x, y)$ according to the foregoing equations. The coordinates converting means 34 can be composed of a microcomputer with an incorporated memory or a calculating circuit.

As an example, the x and y coordinates are made to correspond to the bit map on the bit map memory 35C, and registration patterns are formed on the transfer belt 10 around positions $A(0, 0)$, $B(5000, 0)$, $C(0, 7000)$ and $D(5000, 7000)$ or $x_1=y_1=0$, $x_2=5000$ and $y_2=7000$. It is assumed that these registration marks are detected at positions $A'(12, -12)$, $B'(5036, -24)$, $C'(12, 7012)$ and $D'(5036, 7000)$, so that $x_1'=12$, $y_1'=-12$, $x_2'=5036$, $y_1''=-24$, $x_1''=12$, $y_2'=7012$, $x_2''=5036$ and $y_2''=7000$.

Thus, there are obtained $C_1=5000/5024=0.9952$, $C_2=-12$, $C_3=0.9966$, $C_4=12$ and $C_5=-0.002389$, so that the foregoing equations provide $x=0.9952\times(x'-12)$ and $y=0.9966\times[y'+12-0.002389\times(x'-12)]$.

Consequently, as an example, the coordinate $Q'(1500, 2000)$ of image data is converted into $Q(1481, 2002)$.

Such correction of dot position by the coordinate conversion allows to form image data in the proper position on the transfer belt 10.

The method of coordinate conversion explained above is also applicable, in the same manner, to other colors M, Y and K and can be achieved by determining coefficients $M_1$–$M_5$, $Y_1$–$Y_5$ and $K_1$–$K_5$, corresponding to those $C_1$–$C_5$ in the foregoing equations. A full-color image without color aberration can be obtained by superposing all the color images after the coordinate conversion. In the above-explained calculations, each dot address is determined by rounding the digit under the decimal point.

In the foregoing description, the formation of the registration marks and the calculations of the coefficients $C_1$–$C_5$ etc. are conducted during the pre-rotation cycle, but they may be realized at any timing requiring the correction for the aberration in registration, for example at the start of power supply to the printer, or at a predetermined interval determined by a timer. Also, the present invention, not requiring mechanical correction, allows to significantly reduce the time required for correction, thus significantly expanding the freedom of timing for executing the correction.

Figure 8:
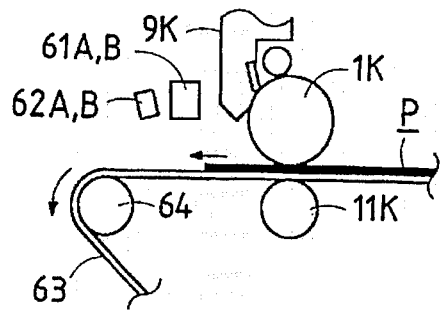
FIG. 8 is a schematic cross-sectional view of another registration mark reading mechanism in the color image forming apparatus of the present invention.

Also, in the foregoing first embodiment, the registration mark formed on the transfer belt is read by the CCD sensors 14A, 14B at the downstream side of the separating position of the recording sheet P, but, as shown in FIG. 8, CCD sensors 61A, 61B and light sources 62A, 62B may be positioned at the upstream side of the separating position of the recording sheet P.

In such case, a roller 64 is required in addition to the transfer roller 11K and the transfer belt 63 becomes somewhat longer, but the registration mark may be formed on the recording sheet P instead of on the transfer belt 63, whereby the color of the transfer belt 63 is not important and the detection of the registration mark is not hindered by the eventual smear of the transfer belt 63.

Figure 9:
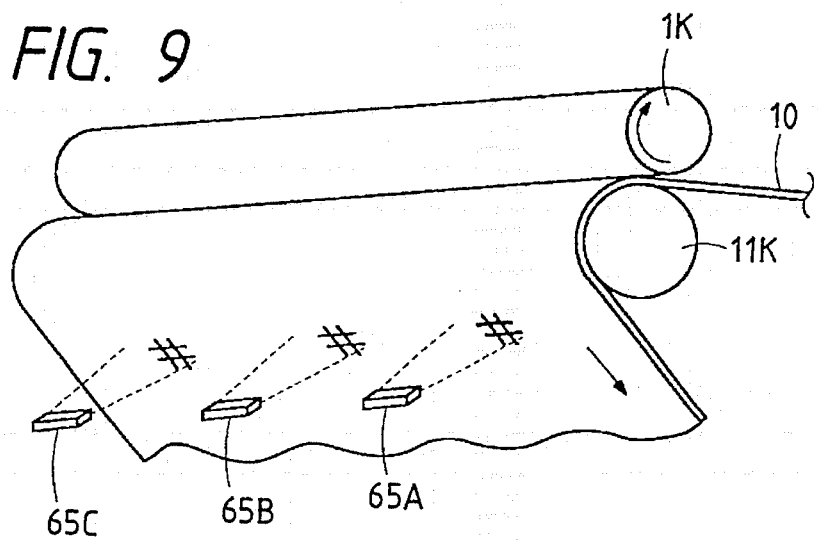
FIG. 9 is a schematic perspective view of another registration mark reading mechanism in the color image forming apparatus of the present invention.

Also, in the foregoing first embodiment, it is assumed to form four registration marks A', B', C', D' in total, or two being arranged respectively in the main and sub scanning directions, but it is rendered possible to detect three registration marks in the main scanning direction, by employing three CCD units 65A, 65B, 65C as shown in FIG. 9. Naturally more than two registration marks may be formed also in the sub scanning direction. In particular, the three registration marks in the main scanning direction enable more detailed correction of the image distortion, resulting for example from a partial distortion of the lens group 55C in the optical system shown in FIG. 4.

Figure 10:
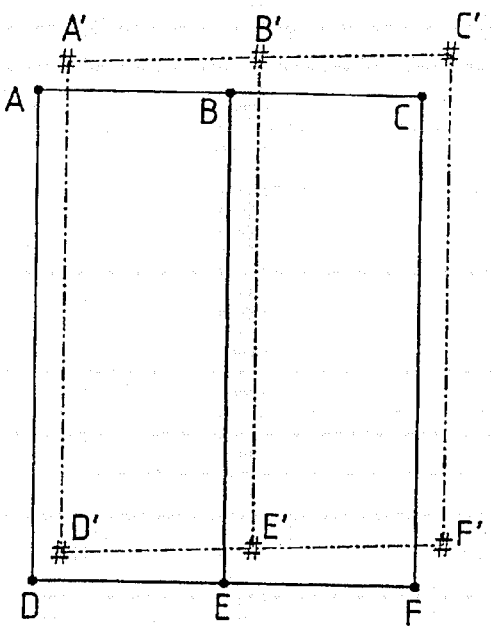
FIG. 10 is a view showing the principle of correction for the aberration in registration in the color image forming apparatus of the present invention.

FIG. 10 shows a case of forming three registration marks in the main scanning direction and two in the sub scanning direction, or six in total, wherein A–F indicate the predetermined positions and A'–F' indicate the actual mark positions. Also, in this case, correction of the dot positions can be achieved by determining the aberration between each of tetrahedrons ABED, BCFE and each of those A'B'E'D', B'C'F'E' as explained in the foregoing and effecting the correction for each rectangle.

The specific method of correction will not be explained as the correction can be achieved, in each area, in the identical manner as explained above.

In general, the distortion of the laser scanning devices 18C–18K is often significantly influenced by the temperature in the printer. For this reason, the prevention of temperature rise is an important factor in a full-color printer provided with plural photosensitive drums.

Figure 11:
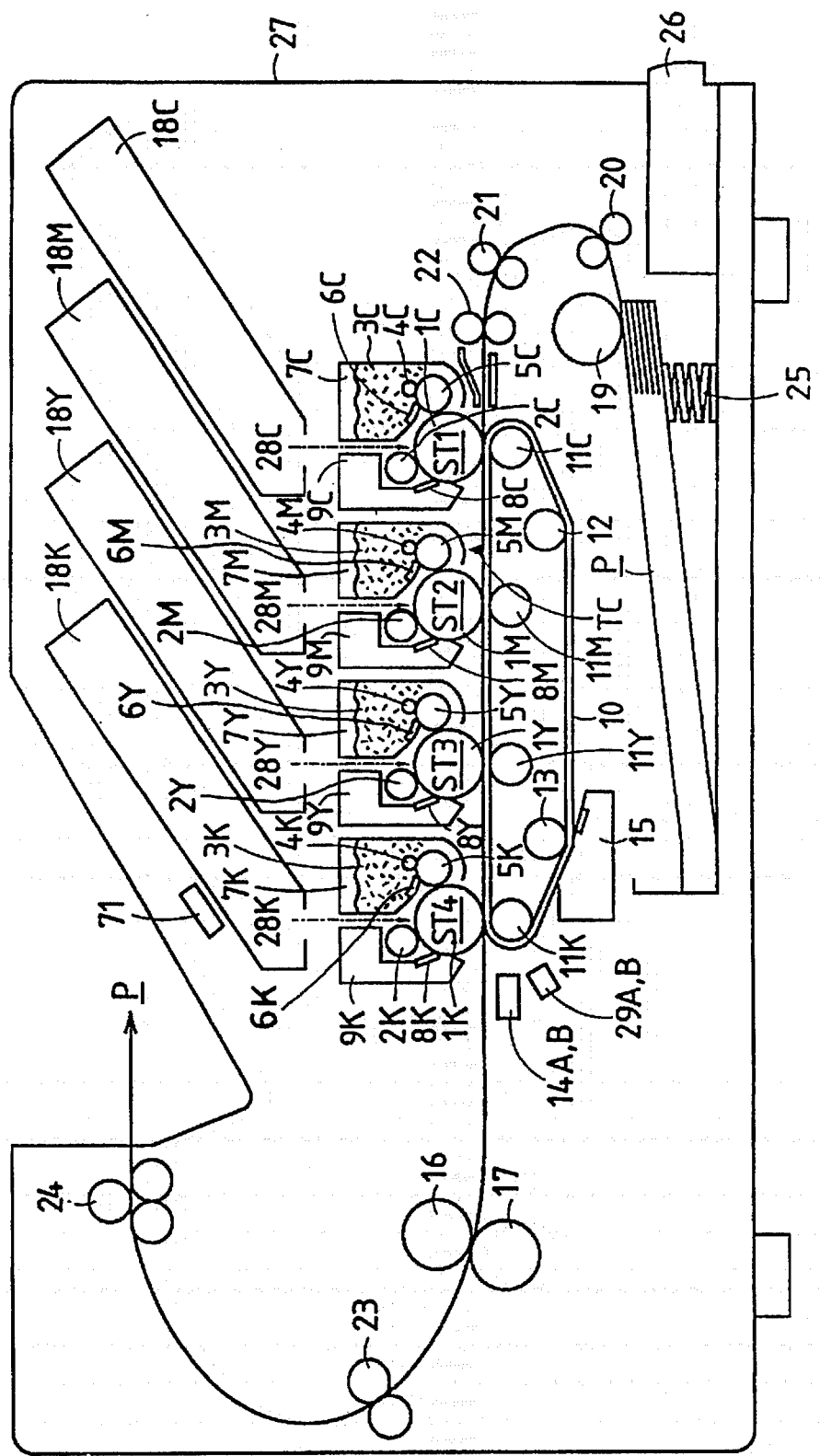
FIG. 11 is a schematic cross-sectional view showing another configuration of the color image forming apparatus constituting the first embodiment of the present invention.

It is, however, possible also to prevent the aberration in color in case of such variation in temperature, by providing a temperature sensor 71 in the vicinity of the optical system as shown in FIG. 11 and correcting the registration by coordinate conversion for each print or at a predetermined interval, in case the detected temperature T exceeds a certain value T1 or is lower than a certain value T2.

Also, in case of single-color printing, the present invention can provide an image with an extremely high print precision with respect to the recording sheet P.

The foregoing embodiment employs dot signals including tonal rendition, but sufficient rendition can be obtained even with binary image signals through the use of dither method or image signals of a higher resolving power, and the present invention is naturally applicable in such case in the identical manner. Furthermore, the present invention is likewise effective in printers employing light sources other than the laser light, such as LED or liquid crystal device.

In the foregoing embodiment, the test toner images are detected and the coordinate data of the color signals at the exposures to the photosensitive members are converted by the coordinate converting means according to the result of the detection to correct the registration of the respective colors. Thus, the correction of registration can be conducted extremely promptly, and in inexpensive and highly reliable manner since the movable member is not required on the correction of the optical path.

[Second Embodiment]

The process in the foregoing first embodiment may result in the following drawback. In case the image magnification and the inclination have to be delicately varied among different colors in the coordinate conversion, there may result streaks in density in a part of the bit map of the coordinate system after the coordinate conversion, because of the influence of the quantizing errors on the original coordinates. Such streaks are not much noticeable in the ordinary image, but become conspicuous in the form of periodical stripes in a uniform image area of medium density.

Figure 18:
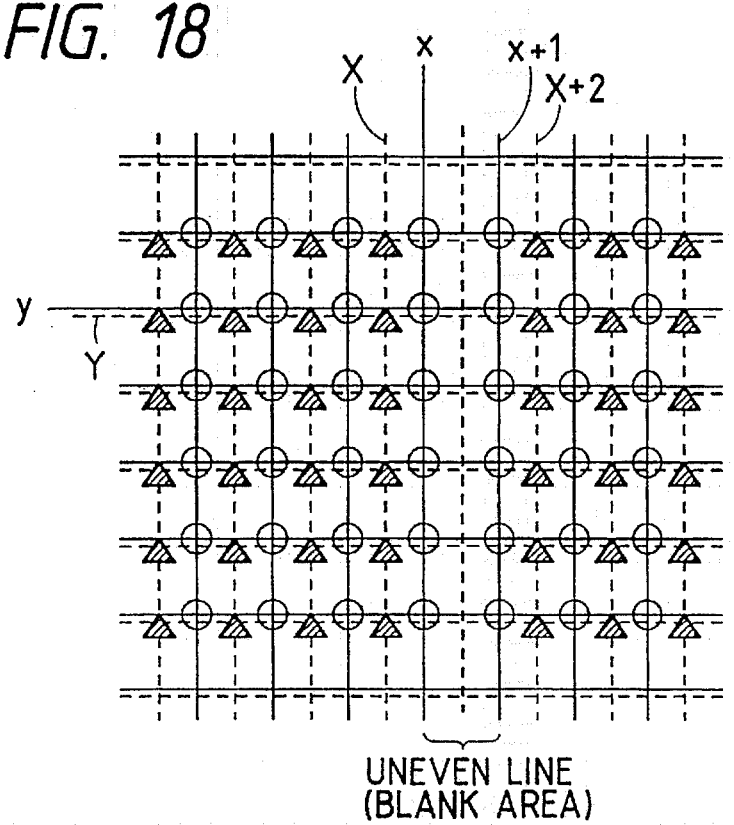
FIG. 18 is a view showing the cause of streak formation in the coordinate conversion process in the color image forming apparatus of the present invention.

More specifically, as the newly formed image data occupy discrete positions in the units of pixels, the determination of the coordinates, for example, by rounding in the digit under the decimal point in the foregoing equations may generate, as shown in FIG. 18, an uncontinuous white streak on the image, due to the error in the quantization.

FIG. 18 is a view showing the cause of the streaks generated in the coordinate conversion process in the color image forming apparatus, illustrating the correspondence between an x-coordinate system on the bit map memory and an X-coordinate system representing the actual print position on the recording sheet.

The coordinate (x, y) in FIG. 18 corresponds to the position on the bit map, while the coordinate (X, Y) corresponds to the actual recording position on the recording sheet. At the coordinate conversion, a quantizing error is generated by the rounding of the coordinate value under the decimal point after conversion. For example x is converted into X while x+1 is converted into X+2, so that X+1 is lacking and a streaking void is formed on the image on the photosensitive drum 1C, as shown in FIG. 18.

The second embodiment is to prevent such bit skipping by the quantizing error, in the main scanning (X) direction. In the following, there will be explained the difference from the foregoing first embodiment.

At first, for fine adjustment of the light beam positions on the photosensitive drums, the X-coordinate data of the bit map memories 35C, 35M, 35Y, 35K are selected larger than the X-coordinate data of the image data C, M, Y, K.

More specifically, the bit map memories 35C, 35M, 35Y, 35K are formed in sizes of 2 to 8 times, thereby picking up the fractions of the x-coordinates below the decimal point, generated in the calculations according to the foregoing equations (3) and reducing the quantizing errors to ½ to ⅛ in the main scanning direction.

Figure 19:
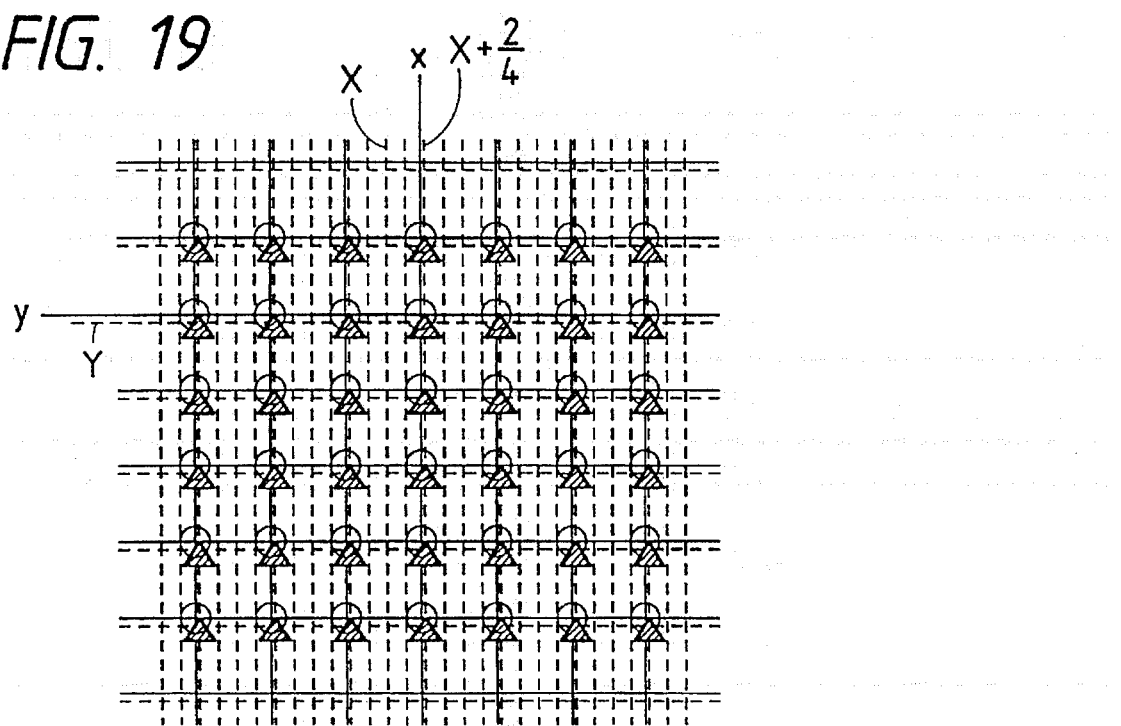
FIG. 19 is a view showing the state after correction of the streak generated in the coordinate conversion process in the color image forming apparatus of the present invention.

Naturally, the line memories 36C, 36M, 36Y, 36K are similarly expanded, and the frequency of the reference signal generating means 31 is quadrapled. As an example, the use of coordinate converting means 34 capable of fractional calculation and bit map memories 35C, 35M, 35Y, 35K and line memories 36C, 36M, 36Y, 36K expanded 4 times enabled fine adjustment of the dot positions on the photosensitive drums 1C, 1M, 1Y, 1K, utilizing the fractional information in the calculations according to the foregoing equations (3), thus preventing formation of streaks by the quantizing errors, as shown in FIG. 19.

In the foregoing description, the registration patterns are formed on the transfer belt 10, but they may naturally be formed on the recording sheet P actually fed onto the belt. In such case the CCD sensors 14A, 14B and the exposure lamps 29A, 29B may be positioned on the feed path of the recording sheet P.

[Third Embodiment]

In the foregoing second embodiment, there is explained the method of preventing vertical streaks resulting from the quantizing errors in the main scanning direction, but horizontal streaks may be similarly formed also in the sub scanning direction (transport direction of the recording sheet), also because of the quantizing error. The third embodiment is to prevent such drawback. In the following there will be explained the difference from the first embodiment.

The above-mentioned drawback results from the error in the quantization according to the foregoing equations (3), and, for avoiding this drawback, the Y-coordinate data of the bit map memories 35C, 35M, 35Y, 35K have to be selected larger than the Y-coordinate data of the image data C, M, Y, K for picking up the fractional information in said equations.

In the sub scanning direction, however, the number of scanning lines has to be changed in order to vary the density of the image. Consequently, it is necessary to increase the revolution of the polygon mirror 54C (and other polygon mirrors for M, Y and K) shown in FIG. 4, beyond the sub scanning density of the image data C, M, Y, K.

More specifically, the revolution should be made 2 to 8 times larger. As an example, the streaks in the sub scanning direction resulting from the quantizing errors can be prevented by rotating the polygon mirrors of the image stations ST1-ST4 with a revolution of four times, whereby the number of scanning lines of the laser beam becomes equal to four times of the sub scanning density of the image data C, M, Y, K, and accordingly varying the magnitude of the bit map memories 35C, 35M, 35Y, 35K and the frequency of the reference signal generating means 31.

[Fourth Embodiment]

The foregoing third embodiment requires an increase in the revolution of the polygon mirrors. The fourth embodiment is advantageously applicable in such case, and its difference from the third embodiment will be explained in the following. In the present fourth embodiment, an imaginary scanning line is formed between the main scanning lines, as shown in FIG. 20.

Figure 20:
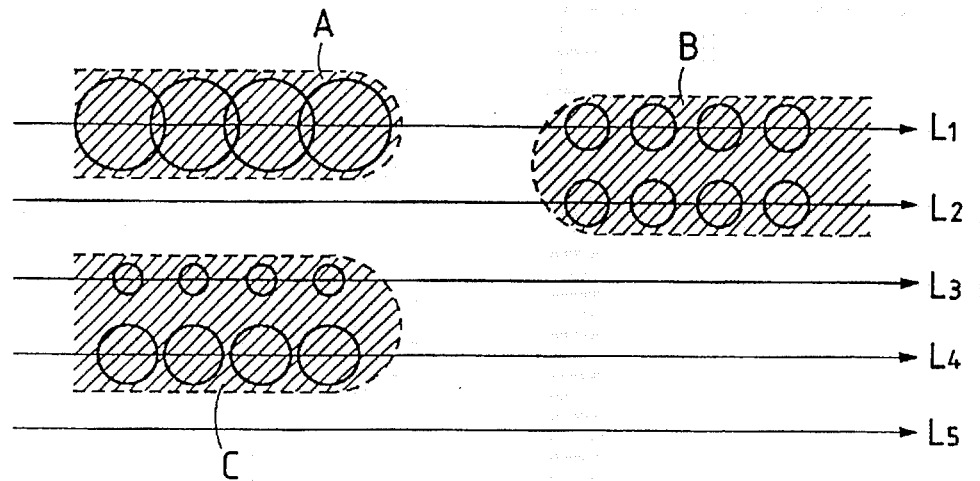
FIGS. 20 and 21 are schematic views showing the laser scanning state for correcting the streaks resulting from the quantizing error in the color image forming apparatus constituting a fourth embodiment of the present invention.

FIG. 20 is a schematic view showing the laser scanning state for correcting the streaks resulting from the quantizing errors, in the color image forming apparatus of the fourth embodiment of the present invention.

In FIG. 20, A indicates a case where the laser beam is emitted with an ordinary duty, whereby a horizontal line is formed along a main scanning line L1.

On the other hand, B indicates a case where the laser beam is emitted with ½ of the ordinary duty in main scanning lines L1 and L2. In this case, an apparent horizontal line is formed between the main scanning lines L1 and L2.

Also, C indicates a case where the laser beam emitted with ¼ of the ordinary duty along a main scanning line L3 and with ¾ of the ordinary duty along a main scanning line L4. In this case, an apparent horizontal line is formed above the main scanning line L4, by ¼ of the pitch of the main scanning lines.

Thus, by weighting the light amounts of the laser beam according to the fractional informations of the foregoing equations (3), there can be obtained an effect similar to the vertical fine adjustment of the main scanning lines, without the increase in the revolution of the polygon mirrors.

This embodiment may be realized by a variation in the emission intensity of the laser beams, namely by a change in the drive current for the lasers, but it can be achieved in a simple manner by employing the pulse width modulation circuits 37C, 37M, 37Y, 37K shown in FIG. 1 also for this purpose.

More specifically, as already explained in the first embodiment, the density information of the image signals C, M, Y, K of 256 levels are directly converted into turn-on times of the laser beams for each dot by the pulse width modulation circuits 37C, 37M, 37Y, 37K.

Consequently the prevention of the horizontal streaks can be achieved by weighting the density data with the fractions in the calculations according to the foregoing equations (3), without expansion of the bit map memories 35C, 35M, 35Y, 35K. As an example, among the image signals C, M, Y, K, it is assumed that a coordinate P'(x', y') for cyan color is converted into P(x, y) by the equations (3), wherein the fractions of x, y below the decimal point are discarded. Also, the corresponding density data is taken as NP, and the fraction of Y below the decimal point in the equations (3) is taken as $\Delta Y$.

Also, for the main scanning lines immediately above and below P(x, y), the coordinates are represented by $P_{-1}(x, y-1)$ and $P_{+1}(x, y+1)$, the density data by $N_{p-1}$, $N_{p+1}$, and fractions of y by $\Delta y-1$, $\Delta y+1$. Thus the density data $N_p{'}$, $N_{p+1}{'}$ after the correction are determined from those $N_p$, $N_{p+1}$ before the correction according to the following equations (4), and the micro-computer 34 corrects the density data to the pulse width modulation circuits 37C, 37M, 37Y, 37K:

$$\begin{cases} N_{p'} = N_p \times (1 - \Delta y) + N_{p-1} \times \Delta y - 1 \\ N_{p+1}{'} = N_{p+1} \times (1 - \Delta y + 1) + N_p \times \Delta y \\ \cdots \\ \cdots \end{cases} \quad (4)$$

Naturally, $N_p{'}$ and $N_{p+1}{'}$ may be represented, instead of the foregoing equations (4), by higher-order equations or functions relating to the fractions $\Delta y-1$, $\Delta y$, $\Delta y+1$, ... and such representation is particularly effective in case the density and the light amount of laser are not linearly related.

Figure 21:
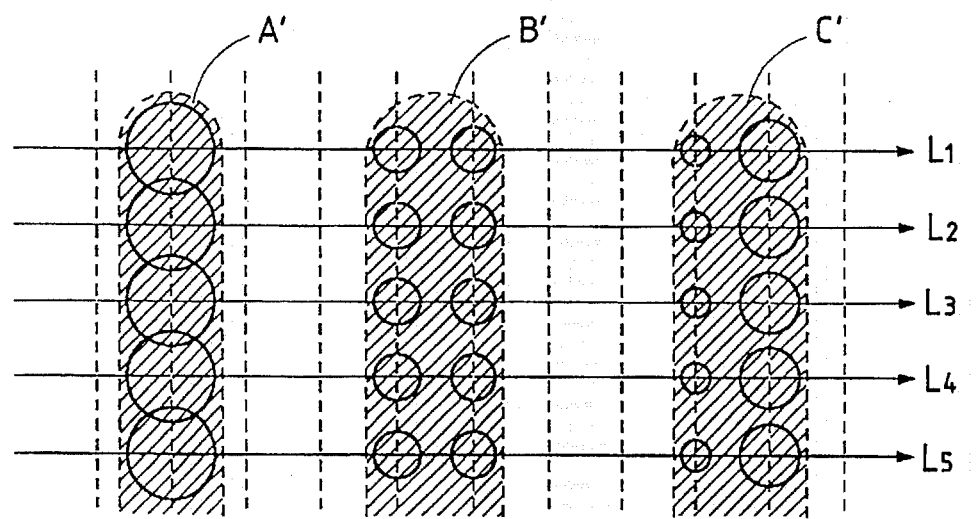

Also, the above-explained method may be applied, as shown in FIG. 21, to the data in the main scanning direction. Such application in the main scanning direction allows to prevent the streaks generated by the quantizing errors in the main scanning direction, without increases in the frequency of the reference signal generating means 31 for recording in the main scanning direction or in the size of the bit map memories 35C, 35M, 35Y, 35K.

The foregoing embodiment employs dot signals with tonal rendition, but sufficient tonal rendition can also be obtained from binary image signals through the use of the dither method or of the image data of a higher resolving power, and the present invention is naturally applicable also in such case in the identical manner. Furthermore, the present invention is likewise effective in printers with light sources other than laser light, for example, such as LED or liquid crystal.

[Fifth Embodiment]

Figure 12:
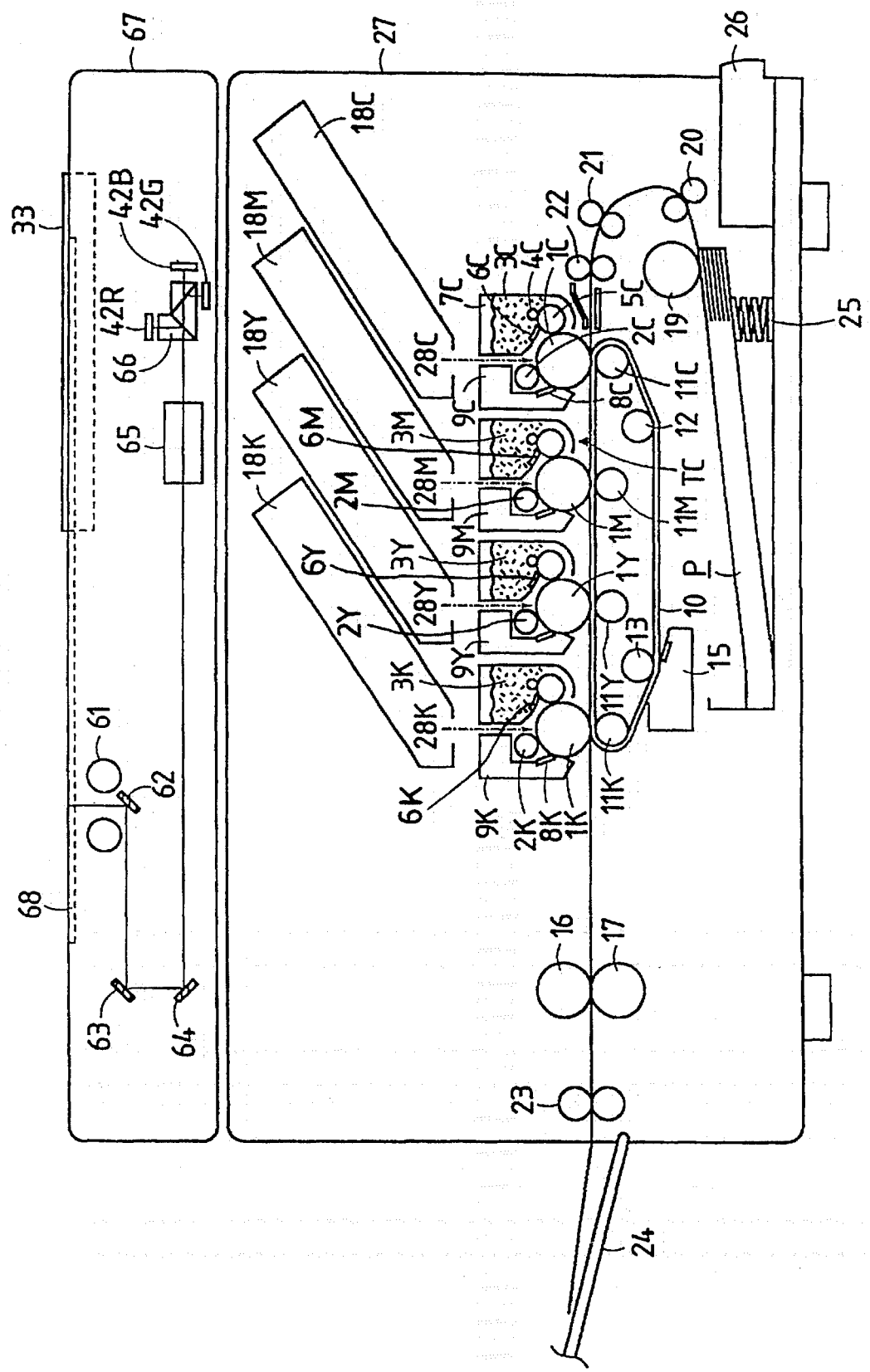
FIG. 12 is a schematic cross-sectional view of a color image forming apparatus constituting a fifth embodiment of the present invention.
Figure 13B:
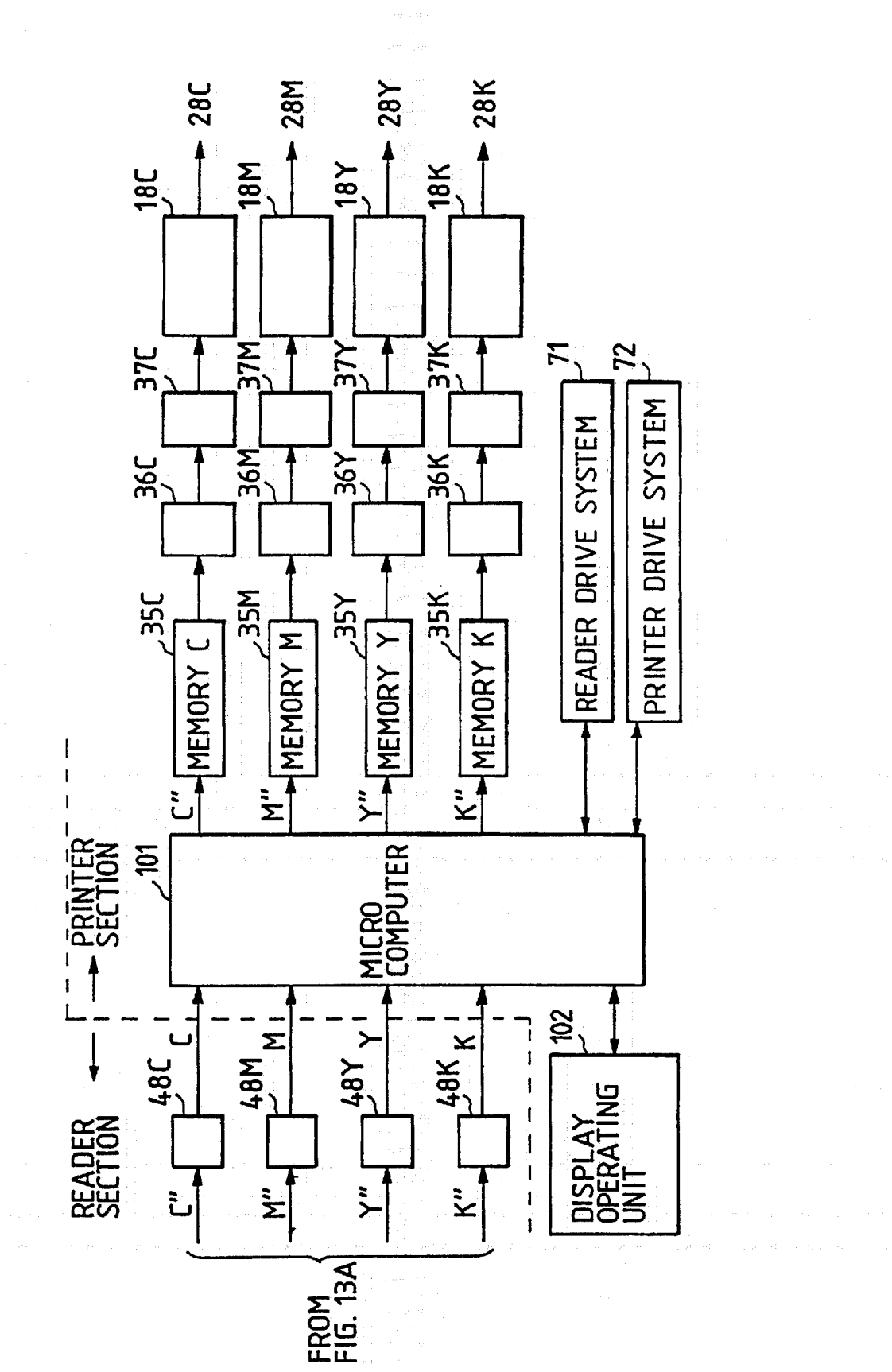
FIG. 13 which is composed of FIGS. 13A and 13B is a block diagram showing the control system of the color image forming apparatus shown in FIG. 12.

FIG. 12 is a schematic cross-sectional view of a color image forming apparatus constituting a fifth embodiment of the present invention. The apparatus constitutes a digital copying apparatus consisting of a color laser beam printer 27, a discharge tray 2, with four drums and a color reader 67, wherein components same as those in FIG. 1 are represented by the same symbols. FIGS. 13A and 13B are block diagrams showing the control system of the color image forming apparatus shown in FIG. 12, wherein the same components as those in FIGS. 3A and 3B are represented by the same symbols.

Referring to FIGS. 13A and 13B, a full-color original image on an original 41 is separated, by optical means of a reader unit 67 as shown in FIG. 12, into three primary colors of red (R), green (G) and blue (B), which are then respectively converted, by CCD sensors 42R, 42G, 42B, into multi-value color signals.

There are provided a light source 61, mirrors 62–64, a lens 65, a light splitting device (such as dichroic prisms) 66 and an original supporting glass 68. For obtaining a satisfactory image, the optical system including the CCD sensors 42R, 42G, 42B preferably has a resolving power of 400 to 600 dot/inch or even higher.

The analog outputs of the CCD sensors 42R, 42G, 42B are converted by A/D converters 43R, 43G, 43B into digital signals corresponding to the luminance.

For obtaining a satisfactory image, there are preferably employed 64–256 density levels or even larger. The luminance data thus obtained are processed in shading correction circuits 44R, 44G, 44B for correcting the fluctuations in the optical systems and in the CCD sensors, and are converted, by gamma conversion units 45R, 45G, 45B, from the red, green and blue luminance data into those of complementary colors of cyan (C'), magenta (M') and yellow (Y') by a reciprocal logarithmic conversion. From thus obtained C', M', Y' data, a black data generating circuit 46 extracts black (K') data. Such extraction may be achieved in various methods, for example by taking the minimum values of C', M', Y' as the black data. The C', M', Y', K' data thus obtained are used in a masking processing circuit 47 for masking in operation.

Then, image data C", M", Y", K" generated in the masking process are subjected to correction of rendition by gamma conversion circuits 48C, 48M, 48Y, 48K in order to match the tonal characteristics of the printer. In the following there will be explained the method printing thus obtained image data C, M, Y, K.

Referring to FIGS. 13A and 13B, the image signals C, M, Y, K involving tonal rendition are at first subjected to coordinate conversion to be explained later, and are then modulated, in pulse width modulation circuits 37C, 37M, 37Y, 37K from the density signals of 256 levels into pulse-width signals corresponding to the turn-on times of the lasers, for supply to laser scanning devices 18C, 18M, 18Y, 18K. The structure of the laser scanning devices 18C, 18M, 18Y, 18K will not be explained as it is similar to that shown in FIG. 4.

In the following, there will be explained the method and the apparatus for preventing aberration in colors C, M, Y, K in the above-explained color image forming apparatus.

At first, a test mode explained in the following is executed prior to the actual printing operation.

Referring to FIG. 12, the test mode is entered by a display/operation unit 33 on the reader unit 67. It will be convenient, in response to the entry, to display necessary messages (such as to set sheets of a predetermined size in the cassette) on the display/operation unit 33.

Figure 14:
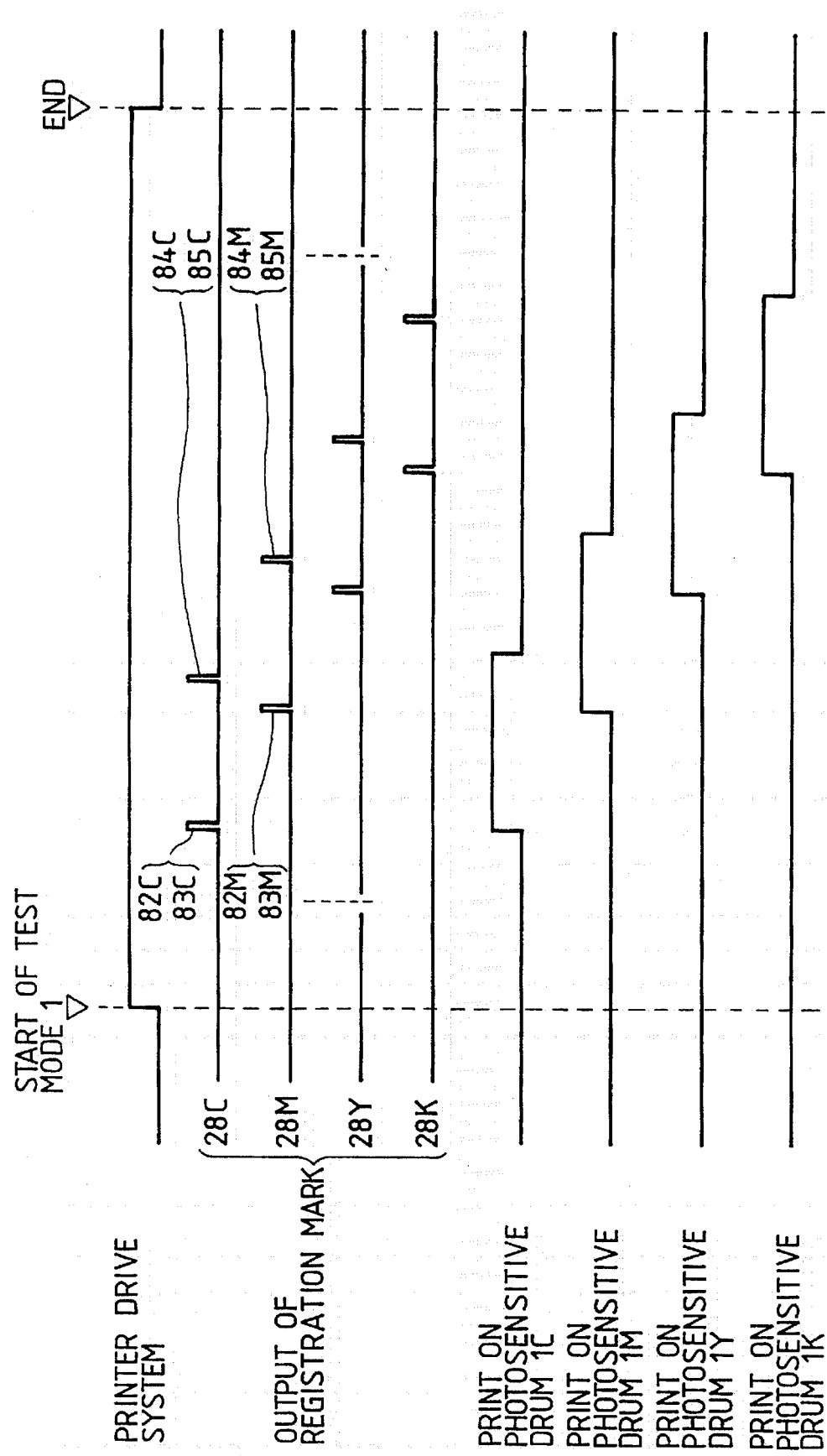
FIG. 14 is a timing chart showing the operation in a test mode 1 in the color image forming apparatus shown in FIG. 12.

In the present embodiment, the test mode is divided into a mode 1 and a mode 2, of which the former is executed simultaneously with the entry by a test mode key, wherein various units function in timings shown in FIG. 14.

FIG. 14 is a timing chart showing the functions of the test mode 1 in the color image forming apparatus shown in FIG. 12.

Figure 15:
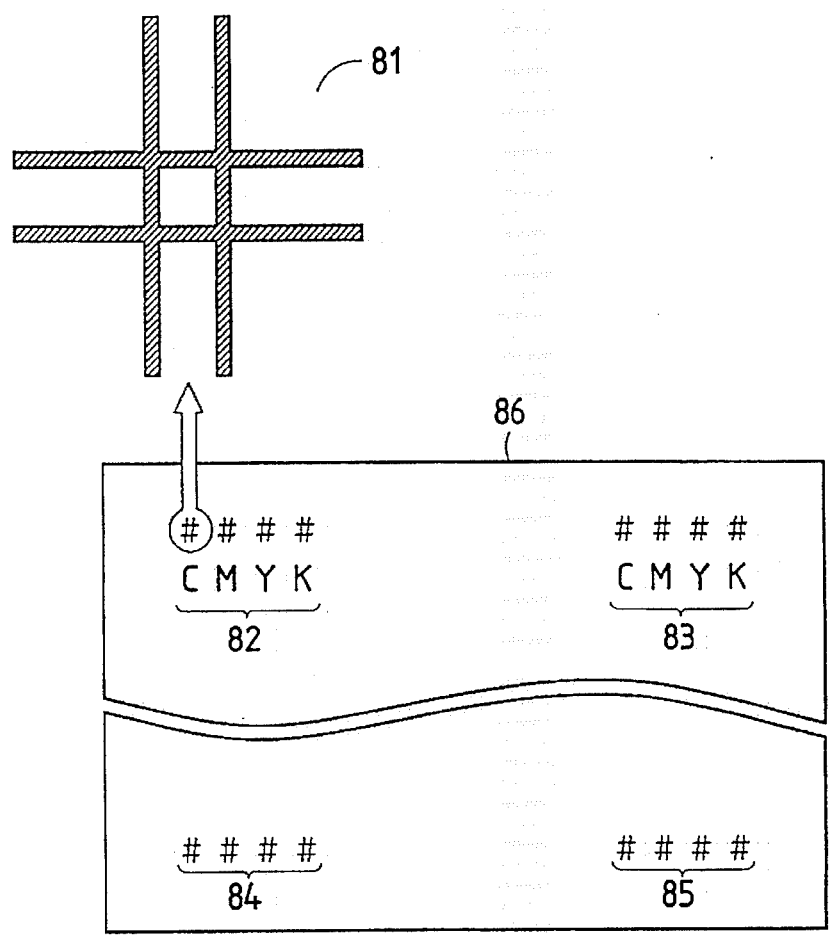
FIG. 15 is a view showing an example of the registration mark for detecting the aberration in registration in the color image forming apparatus shown in FIG. 12.

As shown in FIG. 14, a printer drive system 72 is at first activated, and, when the printing operation is enabled, the recording sheet P is fed from the cassette 26. Then registration marks 81–85 as shown in FIG. 15, stored in a memory of a microcomputer 101 are recorded on the photosensitive drums 1C, 1M, 1Y, 1K with a timing measured from the front end of the recording sheet P and corresponding to the coordinates on the bit map memories 35C, 35M, 35Y, 35K. These registration marks are transferred in succession onto the recording sheet P to obtain a test print 86 shown in FIG. 15.

For facilitating the understanding, the coordinates on the bit map memory 35C corresponding to four registration marks 82, 83, 84, 85 for cyan image data (i.e. corresponding to the center of the registration mark 81) are taken, as shown in FIG. 6, as $A(x_1, y_1)$, $B(x_2, y_1)$, $C(x_1, y_2)$ and $D(x_2, y_2)$.

The test mode 1 is completed by the output of the test print 86, and is then executed the test mode 2, in which the test print 86 is placed at a predetermined position on the original supporting reader unit 67 reader unit 67 and the registration marks 82–85 are read.

It will, therefore, be convenient, simultaneously with the completion of the test mode 1, to display necessary messages (for example to set the test print and to depress a copy button) on a display operating unit 102.

FIG. 16 is a timing chart showing the functions of the test mode 2 in the color image forming apparatus shown in FIG. 12.

At first, in response to the actuation of the copy button, a reader drive system (61–64 in FIG. 1) is advanced to read the registration marks 82–85 on the test print 86 shown in FIG. 15. The obtained image information is subjected to the data processing up to the gamma conversion units 48C, 48M, 48Y, 48K shown in FIGS. 13A and 13B, and the microcomputer 101 detects the coordinates corresponding to the respective registration marks, in comparison with the reference timing. Each of the coordinates corresponds to the center of the registration mark as indicated by 81, and can be known by detecting the edges thereof.

In the present embodiment, the detected coordinates of the cyan registration marks are assumed as $A'(x_1', y_1')$, $B'(x_2', y_1'')$, $C'(x_1'', y_2')$ and $D'(x_2'', y_2'')$, as shown in FIG. 6.

After the calculation of the coordinate conversion coefficients to be explained later, the test mode 2 is terminated by returning the reader drive system 71 to a predetermined position.

The coordinate conversion is conducted in the following manner.

If the laser optical systems of the printer unit 27 and those of the reader unit 67 are free from any error, the coordinates A, B, C, D of the cyan registration marks mentioned above should completely match A', B', C', D'. In practice, however, there are generated aberrations between these two sets of coordinates, for example because of inclination of the mirror 57C, aberration in the focal length of the laser optical system 18C, positional aberration of the photosensitive drum unit 9C, and positional aberrations of the optical systems 61–65 of the reader unit and of the CCD unit 42R (cf. FIG. 6). These amounts of aberration are defined as indicated by the equations (2) in the first embodiment and are processed as indicated by the equations (3).

Coefficients C1-C5 thus determined are stored in the memory in a microcomputer 34. Thus, the test print mode is completely terminated.

In the ordinary print mode, the coordinates of the image data C, M, Y, K are converted in succession and stored in the bit map memories 35C, 35M, 35Y, 35K, by the microcomputer 101 according to the equations (3) in the first embodiment with the correction coefficients $C_1$-$C_5$ for cyan determined above and also with those $M_1$-$M_5$ for magents, those $Y_1$-$Y_5$ for yellow and those $K_1$-$K_5$ for black determined in a similar manner, and these data are read at predetermined timings and recorded on the photosensitive drums 1C, 1M, 1Y, 1K whereby the colors are satisfactorily superposed on the recording sheet P to provide an image without aberration in color.

Also, the precision of printing can be significantly improved as the position of the dot image on the recording sheet P can be made close to the real coordinate.

Furthermore, the present invention can achieve correction at the same time, in case the optical systems 61-66 of the reader unit and the CCD sensors 42R, 42G, 42B contain aberrations in the magnification or inclination.

As an example, let us consider a case of selecting the x and y coordinates corresponding to the bit map on the memory 35C, and forming the registration patterns on the transfer belt, corresponding to positions A(0, 0), B(5000, 0), C(0, 7000) and D(5000, 7000) or $x_1=y_1=0$, $x_2=5000$ and $y_2=7000$. It is also assumed that these registration marks are detected at A'(12, −12), B'(5036, −24), C'(12, 7012) and D'(5036, 7000).

Figure 7:
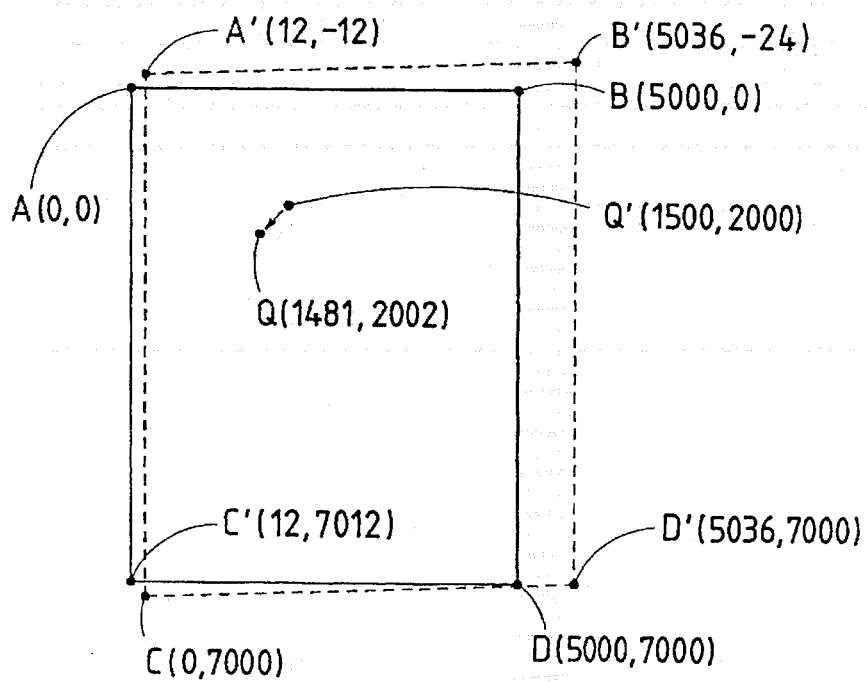

Thus, for $x_1'=12$, $y_1'=-12$, $x_2'=5036$, $y''=24$, $x_1''=12$, $y_2'=7012$, $x_2''=5036$ and $y_2''=7000$, the calculation according to the equations (3) provide $C_1=5000/5024=0.9952$, $C_2$, $C_3=0.9936$, $C_4=12$ and $C_5=-0.002389$, so that, according to the equations (3) in the first embodiment there are obtained $x=0.9952\times(x'-12)$ and $y=0.9966\times[y'+12-0.002389\times(x'-12)]$. Consequently, a coordinate (1500, 2000) of image data Q' is converted, by the coordinate conversion, into Q(1481, 2002) as shown in FIG. 7.

The actual printing operation after the coordinate conversion provided reproduction of the image data properly in the desired positions on the recording sheet P.

In the present embodiment, in the calculations for example according to the equations (3), the dot positions are determined by rounding the digit below the decimal point.

The size of the bit map memories 35C, 35M, 35Y, 35K is selected larger than the size of the printable maximum image data. Also the timing of writing of the image data onto the photosensitive drums 1C, 1M, 1Y, 1K by the laser beams 28C, 28M, 28Y, 28K is determined, based on the basic clock (not shown) of the image process control system and in synchronization with the BD signals from the beam detectors 56C, 56M, 56Y, 56K (cf. FIG. 4, wherein M, Y and K are not shown).

In the foregoing explanation, the registration marks 82-85 in the test mode 1 are formed by preparing bit data in the memory of the microcomputer 101, but it is also possible to prepare a test chart similar to the test print 86 in advance and to read the coordinates of the registration marks on such test chart in the test mode 1.

The coordinates in this case are represented by $A(x_1, y_1)$, $B(x_2, y_2)$, $C(x_3, y_3)$ and $D(x_4, y_4)$, corresponding to the coordinates A, B, C, D in the first embodiment. In this case, however, the microcomputer 101 does not effect coordinate conversion in the test mode 1. The A, B, C, D mentioned above are directly printed by the printer, and the obtained test print is used for executing the test mode 2 in the same manner as in the second embodiment.

Assuming that the test print read in the test mode 2 has the coordinates $A'(x_1', y_1')$, $B'(x_2', y_2')$, $C'(x_3', y_3')$, $D'(x_4', y_4')$, the relation between the coordinate Q(x, y) on the bit map and the actual coordinate Q'(x', y') can be determined by solving x=f(x', y') and y=g(x', y') wherein the function f and g are defined by $x_1, x_2, x_3, x_4, y_1, y_2, y_3, y_4, x_1', x_2', x_3', x_4', y_1', y_2', y_3'$ and $y_4'$. In this case the precision of the optical systems of the reader unit 67 and the printer unit 27 can be individually known from the test mode and the test mode 2. Thus, by registering the coordinates of the test chart (i.e. real coordinates) in advance in the memory of the microcomputer 101, it is rendered possible, through the comparison of the coordinates A, B, C, D with those A', B', C', D', to detect the status of the reader unit and the printer unit, thereby effecting self diagnosis.

Figure 17:
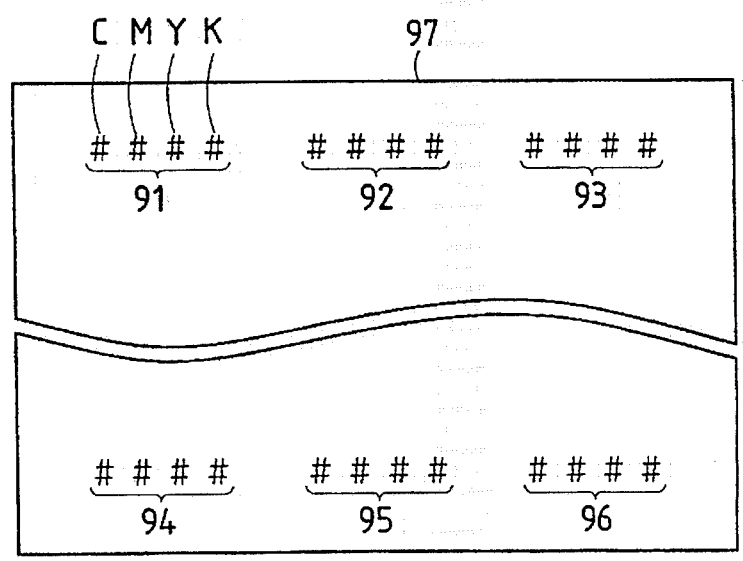
FIG. 17 is view showing the state of formation of another registration mark in the color image forming apparatus constituting the fifth embodiment of the present invention.

In the foregoing description, there are formed four registraion marks A', B', C', D' in total, namely two in the main scanning direction and two in the sub scanning direction, but it is also possible to detect three registration marks in the main scanning direction by forming registration marks 91-96 on test print 97, as shown in FIG. 17. It is naturally possible also to formmore than two registration marks in the sub scanning direction. In particular, the three registration marks in the main scanning direction enable more detailed correction of the image distortion, resulting for example from a partial distortion of the lens group 55C in the optical system shown in FIG. 4.

FIG. 10 shows a case of forming three registration marks in the main scanning direction and two in the sub scanning direction, or six in total, wherein A-F indicates the predetermined positions and A'-F' indicate the actual mark positions. Also in this case, correction of the dot positions can be achieved by determining the aberration between each of tetrahedrons ABED, BCFE and each of those A'B'E'D', B'C'F'E' as explained in the foregoing and effecting the correction for each rectangle. The specific method of correction will not be explained as the correction can be achieved, in each area, in the identical manner as explained above.

Also, in case of single-color printing, the present invention can provide an image with an extremely high print precision with respect to the recording sheet P.

The foregoing embodiment employs dot signals including tonal rendition, but sufficient rendition can be obtained even with binary image signal through the use of dither method or image signals of a higher resolving power, and the present invention is naturally applicable in such case in the identical manner.

Furthermore, the present invention is likewise applicable in printers employing light sources other than the laser light, such as LED or liquid crystal device.

Furthermore, the foregoing embodiments may be combined in arbitrary manner. For example the second embodiment may be combined with the third or fourth embodiment, and the fifth embodiment may be added further. Also the fifth embodiment can be easily combined with any of the second to fourth embodiments.

The present invention is not limited to the foregoing embodiments, but is subject to various modifications within the scope and spirit of the appended claims.

What is claimed is:

1. A color image forming apparatus provided with a plurality of image stations each including exposure means for irradiating a photosensitive member with a light beam modulated by a respective color signal thereby forming an electrostatic latent image, development means for developing the electrostatic latent image, formed by said exposure means on said photosensitive member, thereby forming a visible image, and transfer means for transferring a respective color image rendered visible by said development means onto a recording sheet, wherein color images formed by the plurality of image stations are transferred in succession onto a transfer material transported by transport means, comprising:

test pattern generation means for generating test pattern data for detecting aberration in registration;

memory means for storing the test pattern data of respective colors generated by said test pattern generation means;

reader means for reading test pattern images formed in the plurality of image stations based on the test pattern data of the respective colors read from said memory means;

coordinate data generation means for generating formation coordinate information of each pattern, from image information of each test pattern read by said reader means; and coordinate conversion means for automatically converting an output coordinate position of image data of the respective color to an output coordinate position corrected for the aberration in registration, based on the amount of aberration determined from the formation coordinate information of each pattern generated by said coordinate data generation means and from predetermined reference position information, wherein the image data of the respective color converted by said coordinate conversion means are developed in the memory means and, in the exposure means of the image stations, the photosensitive members are respectively exposed to the light beams modulated according to thus developed image data.

2. A color image forming apparatus according to claim 1, wherein said reader means is adapted to read a test pattern image, formed in each image station based on the test pattern data of respective color read from said memory means and transferred onto the transfer material on said transport means.

3. A color image forming apparatus according to claim 1, wherein said coordinate conversion means is adapted to convert the output coordinate position by an amount smaller than the minimum dot unit of the color signal.

4. A color image forming apparatus according to claim 3, further comprising:

correction means for correcting a light amount of a pulse width modulated light beam, based on the image data of the respective color converted by said coordinate conversion means.

5. A color image forming apparatus according to claim 4, wherein said correction means is adapted to correct a light amount of said light beam by correcting a turn-on time of each exposed dot under pulse width modulation, based on the image data of the respective color converted by said coordinate conversion means.

6. A color image forming apparatus composed of a reader unit for optically reading an original image, and a printer unit provided with a plurality of image stations each including exposure means for irradiating a photosensitive member with a light beam modulated by a respective color signal based on respective color image information released from said reader unit thereby forming an electrostatic latent image, development means for developing the electrostatic latent image formed on said photosensitive member by said exposure means into a visible image, and transfer means for transferring the image rendered visible by said development means onto a recording sheet, wherein color images formed by the plurality of image stations are transferred in succession onto the recording sheet transported by transport means thereby forming a color image, comprising:

first test mode process means for printing, on said recording sheet, registration marks consisting of predetermined patterns having reference coordinates in the image stations of said printer unit;

second test mode process means for reading, by said reader unit, the registration marks formed on the recording sheet by said first test mode process means thereby detecting the coordinates of positions of said registration marks; and coordinate conversion means for automatically converting an output coordinate position of image data of each color into an output coordinate position corrected for aberration in registration, based on an amount of aberration determined from the coordinates of positions of said registration marks detected by said second test mode process means and from a predetermined reference coordinate, wherein image data of respective colors converted by said coordinate conversion means in memory means, and, the exposure means makes exposure onto the plural photosensitive members with the light beam modulated according to said image data developed.

7. A color image forming apparatus according to claim 6, wherein said coordinate conversion means is adapted to convert the output coordinate position by an amount smaller than the minimum dot unit of the color signal.

8. A color image forming apparatus according to claim 7, further comprising:

correction means for correcting a light amount of a pulse width modulated light beam, based on the image data of the respective color converted by said coordinate conversion means.

9. A color image forming apparatus according to claim 8, wherein said correction means is adapted to correct a light amount of said light beam by correcting a turn-on time of each exposed dot under pulse width modulation, based on the image data of the respective color converted by said coordinate conversion means.

10. A color image forming apparatus provided with plural image stations respectively corresponding to different color components and adapted to form images of respectively corresponding color components in succession and in a superposed manner on a recording medium transported through said plural image stations, comprising:

memory means for storing image data of respective color components to be supplied to the image stations;

detection means for detecting aberration in registration of the image of respective color components formed by said image stations; and control means for controlling write-in positions of the image data of respective color components into said memory means, based on the output of said detection means.

11. A color image forming apparatus according to claim 10, wherein each of said image stations further comprises means for forming an image of a respective color component on an image bearing member, and means for transferring the image, formed on said image bearing member, onto said transported recording medium.

12. A color image forming apparatus according to claim 11, wherein said image forming means includes means for scanning said image bearing member with a light beam modulated based on the image data, and means for developing a latent image formed on said image bearing member by the scanning with the light beam by said scanning means.

13. A color image forming apparatus according to claim 10, wherein said detection means includes means for supplying each of the image stations with data represented a predetermined pattern, and means for reading the predetermined pattern formed by each of the image stations based on thus supplied data.

14. A color image forming apparatus according to claim 10, wherein said memory means is adapted to store the image data with a resolving power larger than that of the supplied image data.

15. A color image forming apparatus according to claim 14, wherein each of the image stations is adapted to form an image with a resolving power equal to that of said memory means.

16. A color image forming apparatus according to claim 14, further comprising means for generating image data of a dot, based on the image data of plural dots.

17. A color image forming apparatus according to claim 10, further comprising:
   reader means for reading an original and generating image data of respective color components,
   wherein said detection means is adapted to detect aberration in registration of the images of respective color components formed by the image stations, based on image data obtained when a copy, prepared by said color image forming apparatus from a predetermined original, is read again by said reader means.

18. A color image forming apparatus according to claim 17, wherein said memory means is adapted to store the image data with a resolving power larger than that of the supplied image data.

19. A color image forming apparatus according to claim 18, wherein each of the image stations is adapted to form an image with a resolving power equal to that of said memory means.

20. A color image forming apparatus according to claim 18, further comprising means for generating image data of a dot, based on the image data of plural dots.

* * * * *

UNITED STATES PATENT AND TRADEMARK OFFICE
CERTIFICATE OF CORRECTION

PATENT NO. : 5,715,498
DATED : February 3, 1998
INVENTOR(S) : Takeuchi et al.

Page 1 of 2

It is certified that error appears in the above-identified patent and that said Letters Patent is hereby corrected as shown below:

Title page;

[56] <u>References Cited</u>:

U.S. PATENT DOCUMENTS

"De Jong et al." should read --de Jong et al.--.

[57] <u>ABSTRACT</u>:

Line 7, "the a" should read --the--.

<u>COLUMN 14</u>:

Line 67, "quadrapled." should read --quadrupled.--.

<u>COLUMN 17</u>:

Line 33, "into." should read --into--.

<u>COLUMN 18</u>:

Line 27, "reader unit 67" (first occurrence) should read --glass 68 of the--.

<u>COLUMN 20</u>:

Line 25, "formmore" should read --form more--.

UNITED STATES PATENT AND TRADEMARK OFFICE
CERTIFICATE OF CORRECTION

PATENT NO. : 5,715,498
DATED : February 3, 1998
INVENTOR(S) : Takeuchi et al.

It is certified that error appears in the above-identified patent and that said Letters Patent is hereby corrected as shown below:

COLUMN 21:

Line 24, "the" should read --a--.

COLUMN 23:

Line 9, "represented" should read --representing--.

Signed and Sealed this

Twenty-eighth Day of July, 1998

Attest:

BRUCE LEHMAN

Attesting Officer    Commissioner of Patents and Trademarks